US012751467B2

(12) United States Patent
Bollinger et al.

(10) Patent No.: US 12,751,467 B2
(45) Date of Patent: Oct. 6, 2026

(54) METHODS FOR CONVEYING CONFECTION MOLDS

(71) Applicant: The Hershey Company, Hershey, PA (US)

(72) Inventors: Terence M. Bollinger, Harrisburg, PA (US); Steven A. Weis, Harrisburg, PA (US); Gerald Thomsen, Palmyra, PA (US)

(73) Assignee: THE HERSHEY COMPANY, Hershey, PA (US)

( * ) Notice: Subject to any disclaimer, the term of this patent is extended or adjusted under 35 U.S.C. 154(b) by 439 days.

(21) Appl. No.: 18/450,273

(22) Filed: Aug. 15, 2023

(65) Prior Publication Data

US 2023/0404104 A1 Dec. 21, 2023

Related U.S. Application Data

(62) Division of application No. 17/801,758, filed as application No. PCT/US2022/026559 on Apr. 27, 2022, now Pat. No. 11,758,919.

(Continued)

(51) Int. Cl.
*A23G 1/00* (2025.01)
*A23G 1/26* (2006.01)

(Continued)

(52) U.S. Cl.
CPC ............. *A23G 1/26* (2013.01); *A23G 1/0066* (2013.01); *A23G 1/0093* (2013.01); *A23G 3/0278* (2013.01); *B65G 35/066* (2013.01)

(58) Field of Classification Search
CPC ...... A23G 1/26; A23G 1/0066; A23G 1/0093; A23G 3/0278; B65G 35/066

(Continued)

(56) References Cited

U.S. PATENT DOCUMENTS 2,403,942 A 7/1946 Mathers
3,429,466 A 2/1969 Puderbach (Continued)

FOREIGN PATENT DOCUMENTS

CN 117222322 A 12/2023
DE 102016009014 A1 * 3/2017 ........... A23G 3/0025

(Continued)

OTHER PUBLICATIONS

Translation of DE-102016009014-A1 (Year: 2017).*

(Continued)

*Primary Examiner* — Brent T O'Hern
(74) *Attorney, Agent, or Firm* — Shook Hardy & Bacon L.L.P.

(57) ABSTRACT

Methods of confection mold conveying are provided. An example method includes translating, in a first direction, a first pusher bar having spaced apart first pusher fingers oriented to engage confection mold trays while the first pusher bar is translated in the first direction. The method includes translating, in a second direction opposite the first direction, the first pusher bar where the first pusher fingers are oriented to avoid engagement with the confection mold trays while the first pusher bar is translated in the second direction. The first pusher bar is translated within a first conveyor segment of a confection mold conveyor. The method includes rotating a first rotatable shaft with a first helical channel formed therein that is sized and configured to move the confection mold trays. The first rotatable shaft is positioned to receive the confection mold trays from the first conveyor segment.

20 Claims, 14 Drawing Sheets

Related U.S. Application Data

(60) Provisional application No. 63/180,422, filed on Apr. 27, 2021.

(51) Int. Cl.
*A23G 3/02* (2006.01)
*B65G 35/06* (2006.01)

(58) Field of Classification Search
USPC .......................................................... 426/515
See application file for complete search history.

(56) References Cited

U.S. PATENT DOCUMENTS

| | | | |
|---|---|---|---|
| 3,459,314 | A | 8/1969 | Faerber |
| 4,203,514 | A | 5/1980 | Hirai |
| 4,330,245 | A | 5/1982 | Billett et al. |
| 4,947,979 | A | 8/1990 | Martin et al. |
| 5,079,022 | A | 1/1992 | Jeanneret |
| 5,087,189 | A | 2/1992 | Jeanneret |
| 5,193,329 | A | 3/1993 | Loffredo et al. |
| 5,569,472 | A | 10/1996 | Cerboni |
| 5,591,464 | A | 1/1997 | Renzo |
| 5,683,728 | A | 11/1997 | Cerboni |
| 6,159,520 | A | 12/2000 | Aasted |
| 6,223,881 | B1 | 5/2001 | Carle |
| 8,813,948 | B2 | 8/2014 | Brunee |
| 9,924,732 | B2 | 3/2018 | Tanis |
| 10,167,141 | B2 | 1/2019 | Van Meulenbeke |
| 10,654,660 | B2 | 5/2020 | Ragan et al. |
| 2009/0100855 | A1 | 4/2009 | Mckay |
| 2011/0041706 | A1 | 2/2011 | Whetstone, Jr. |
| 2011/0045114 | A1 | 2/2011 | Whetstone, Jr. |
| 2011/0045155 | A1 | 2/2011 | Whetstone, Jr. |
| 2014/0069780 | A1 | 3/2014 | Iba |
| 2017/0049122 | A1 | 2/2017 | Laurijssen |
| 2017/0064976 | A1 | 3/2017 | Tanis |
| 2017/0354163 | A1 | 12/2017 | Van Meulenbeke |
| 2020/0337331 | A1 | 10/2020 | Chong et al. |

FOREIGN PATENT DOCUMENTS

| | | | |
|---|---|---|---|
| DE | 202016008158 | U1 | 4/2017 |
| EP | 2 108 263 | B1 | 9/2011 |
| EP | 2213179 | B1 | 3/2012 |
| EP | 3031334 | B1 | 6/2019 |
| EP | 3395726 | B1 | 9/2020 |
| FR | 2228689 | A1 | 12/1974 |
| WO | 2020148359 | A1 | 7/2020 |
| WO | 2022/232288 | A1 | 11/2022 |

OTHER PUBLICATIONS

Extended European Search Report received for European Application No. 22796651.2, mailed on Jan. 24, 2025, 10 pages.
International Preliminary Report on Patentability received for PCT Application No. PCT/US2022/026559, mailed on Nov. 9, 2023, 7 pages.
"Carle & Montanari—OPM and CM-FI MA at IBA 2018," TechnoFoodBev, Retrieved from Internet URL: <https://www.technofoodbev.com/en/news/427 /carle--montanari--opm-and-cm-fima-at-iba-2018 .html>, pp. 2 (Jul. 2018).
"QJZ-I(11) Servo Driven Chocolate Moulding Plant," ChocTek, SAINTY International Group, Retrieved from Internet URL: <www.saintyco.com/wp-content/uploads/2017 /10/qjz-i-ii-servo-driven-chocoloate-moulding-plant.pdf>, pp. 2 (2022).
"MKCD-450 One Shot Chocolate Moulding Line," Memak, Retrieved from Internet URL: <http://www.memak.com/en/chocolate_machines-12/moulding_lines-54/mkcd_ 450_chocolate_one_shot_moulding_line-195.html>, p. 1 (2022).
"Carle & Montanari—OPM and CM-FIMA at IBA 2018," TechnoFoodBev, Jul. 2018, <https://www.technofoodbev.com/en/news/427/carle--montanari--opm-and-cm-fima-at-iba-2018.html>, 2 pages.
"QJZ-I(II): Servo Driven Chocolate Moulding Plant," ChocTek, Sainty International Group, <www.saintyco.com/wp-content/uploads/2017/10/qjz-i-ii-servo-driven-chocoloate-moulding-plant.pdf>, 2 pages.
International Preliminary Report on Patentability received for PCT Patent Application No. PCT/US2022/026559, mailed on Nov. 9, 2023, 7 pages.
International Search Report and Written Opinion received for PCT Patent Application No. PCT/US2022/026559, mailed on Jul. 20, 2022, 7 pages.
Office action received for Indian Patent Application No. 202347071370, mailed on Jan. 4, 2024, 2 pages (2 pages of Original OA.
Translation of DE-202016008158-U1 (Year: 2017).

* cited by examiner

METHODS FOR CONVEYING CONFECTION MOLDS

CROSS-REFERENCE TO RELATED APPLICATIONS

This application is a divisional application of U.S. application Ser. No. 17/801,758, entitled "System and Method for Conveying Confection Molds," filed on Aug. 23, 2022, now issued as U.S. Pat. No. 11,758,919; which is a National Stage Application of International Application No. PCT/US2022/026559, entitled "System and Method for Conveying Confection Molds," and having an international filing date of Apr. 27, 2022; which claims priority to U.S. Provisional Application No. 63/180,422, entitled "System and Method for Conveying Confection Molds," filed on Apr. 27, 2021. Each of the aforementioned applications is expressly incorporated herein by reference it its entirety.

BACKGROUND OF THE INVENTION

Confection molds can be used to form chocolates or other such candy or confections therein. Generally, the confection material forming the confection is heated until liquefied. The liquefied material is placed into confection molds and then cooled and removed from the confection molds in its final hardened state.

When confections are mass-produced, manual labor can be used for each of these steps and/or some automation can be employed. However, automated systems for transporting confection molds utilize chains, sprockets, shafts, and other mechanisms which accumulate liquid which has dripped or spilled over edges of the confection molds, particularly during frequent starts and stops (e.g., stopping an automated motion of a confection mold to fill it with liquefied confection) or when being moved from one segment of the system to another. The spilled liquefied confection that accumulates in these mechanisms can impact the overall hygiene of the automated system and may impact the working performance of the automated system.

BRIEF SUMMARY OF THE INVENTION

The present disclosure is directed, in part, to systems and methods for conveying confection mold trays during manufacturing of a confection product, such as chocolate nuggets or the like. According to one aspect of the technology, a confection mold conveying system has a first conveyor segment and a second conveyor segment. The first conveyor segment may comprise a first pusher bar and a series of spaced apart first pusher fingers extending from the first pusher bar. The first pusher fingers are each oriented to engage one or more confection mold trays while the first pusher bar is translated in a first direction, and the first pusher fingers are each oriented to avoid engagement with the one or more confection mold trays while the first pusher bar is translated in a second direction opposite the first direction. The result is intermittent movement of the confection mold trays in the first conveyor segment, which may allow for filling of the confection mold trays while at rest.

The second conveyor segment is aligned in the first direction with the first conveyor segment and is positioned to receive the confection mold trays from the first conveyor segment. The second conveyor segment can include a first rotatable shaft with a first helical channel formed therein that is sized and configured to receive a first tab of a respective one of the confection mold trays. With the first tab in the first helical channel, rotation of the rotatable shaft continuously advances the respective one of the confection mold trays in the first direction.

According to another aspect, the confection mold conveying system can further include one or more of the confection mold trays. Each of the confection mold trays can have a top surface delimited by a first edge and at least one mold cavity formed therein, as well as a bottom surface opposite the top surface. Furthermore, the confection mold trays can include the first tab protruding from the first edge. The confection mold trays can each be conveyed along the first and second conveyor segments described above, first intermittently along the first conveyor segment, followed by continuous conveying along the second conveyor segment.

According to yet another aspect, methods for conveying confection mold trays include a step of conveying one or more confection mold trays along a first conveyor segment. The first conveyor segment can include a series of spaced apart first pusher fingers extending from a first pusher bar being translated in a first direction and a second direction opposite the first direction. The first pusher fingers can each be oriented to engage the one or more confection mold trays while the first pusher bar is translated in the first direction. Conversely, the first pusher fingers can each be oriented to avoid engagement with the one or more confection mold trays while the first pusher bar is translated in the second direction. The method for conveying confection mold trays can further include a step of continuously advancing the one or more confection mold trays along a second conveyor segment. The second conveyor system can be aligned in the first direction with the first conveyor segment and positioned to receive the one or more confection mold trays from the first conveyor segment. The second conveyor segment can include a first rotatable shaft with a first helical channel formed therein that is sized and configured to receive a first tab of one of the confection mold trays. Rotation of the rotatable shaft can continuously advance the confection mold trays in the first direction.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Aspects of the present disclosure are described in detail herein with reference to the attached figures, which are intended to be examples and non-limiting, wherein.

DETAILED DESCRIPTION OF THE INVENTION

Figure 1:
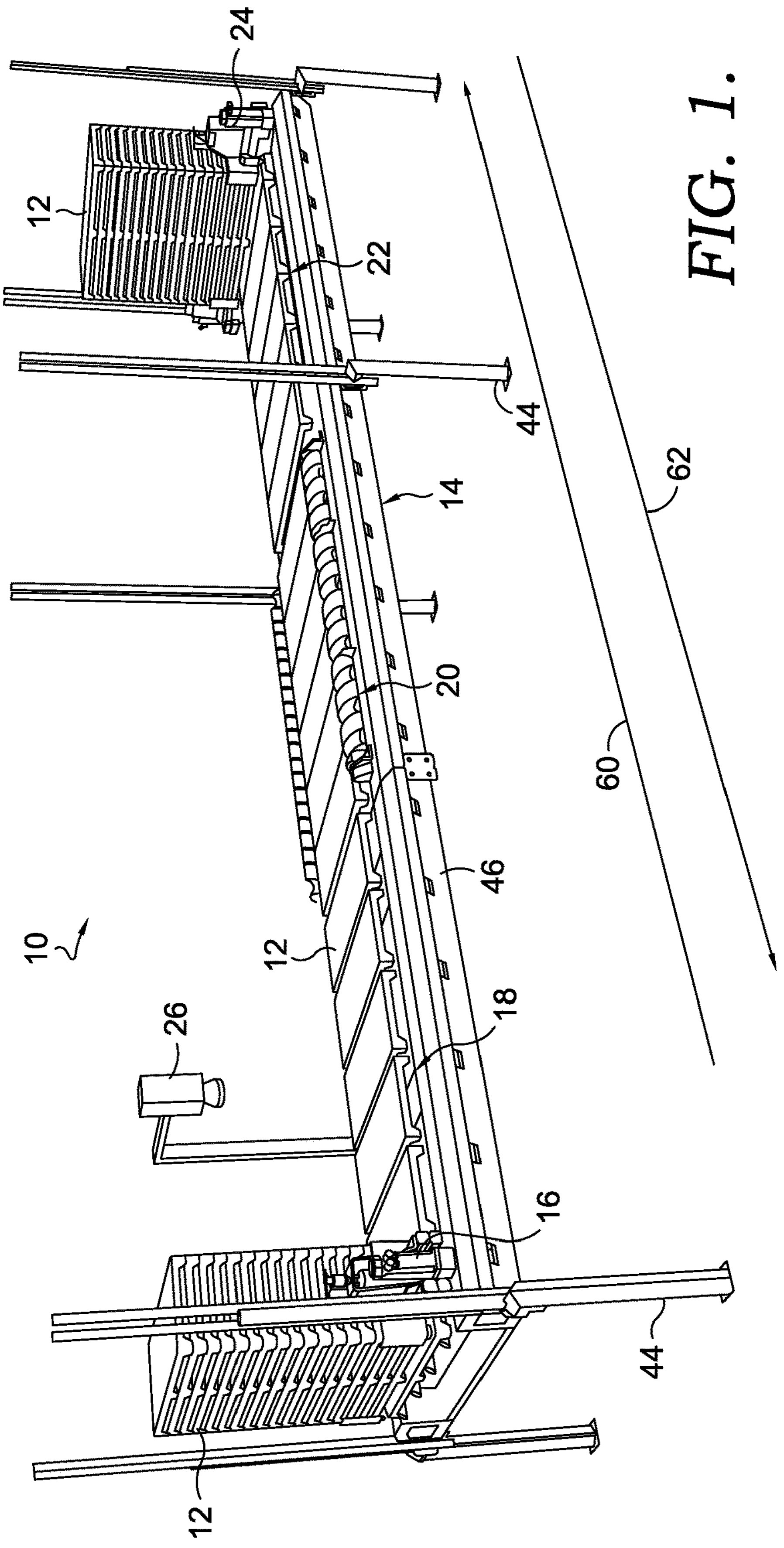
FIG. 1 depicts a perspective view of a confection mold conveying system, in accordance with aspects herein.

The subject matter of aspects of the invention is described with specificity herein to meet statutory requirements. However, the description itself is not intended to limit the scope of this disclosure. Rather, it is contemplated that the disclosed and claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

By way of background, confection molds used to form chocolates or other such candy or confections therein can be transported in an automated fashion through multiple stations, each station performing one or more steps of a method for making confections in the confection molds. Generally, a method for making confections can include the confection ingredients being combined and heated until liquefied, placed into cavities of the confection molds, and then cooled and removed from the confection molds in their final hardened state.

Unfortunately, some automated systems for transporting confection molds utilize chains, sprockets, shafts, and other mechanisms beneath the molds which accumulate dripped or spilled liquid from over the edges of the confection molds, particularly during frequent starts and stops (e.g., stopping an automated motion of a confection mold in order to fill it with liquefied confection) or when being moved from one segment or station of the system to another. The spilled liquefied confection accumulates in the chains, sprockets, shafts and other mechanisms and can impact the automated system and may impact the working performance of the automated system. To address these and other deficiencies of current confection-making systems, a confection mold conveying method and system which eliminates chains, sprockets, shafts, and other mechanisms is provided herein within intermittent conveying of confection molds or confection mold trays along a first conveyor segment where the confection mold trays are filled with liquefied confection, followed by continuous conveying of the confection mold trays along a second conveyor segment where the liquefied confection in the confection mold trays is cooled and thereby hardened into a solid state.

Specifically, a first aspect of the present disclosure is directed to a confection mold conveying system having a first conveyor segment and a second conveyor segment. The first conveyor segment may comprise a first pusher bar and a series of spaced apart first pusher fingers extending from the first pusher bar. The first pusher fingers are each oriented to engage one or more confection mold trays while the first pusher bar is translated in a first direction, and the first pusher fingers are each oriented to avoid engagement with the one or more confection mold trays while the first pusher bar is translated in a second direction opposite the first direction. This results in intermittent movement of the confection mold trays in the first conveyor segment, allowing for filling of the confection mold trays while at rest (i.e., as the first pusher bar is translated in the second direction).

The second conveyor segment is aligned in the first direction with the first conveyor segment and is positioned to receive the confection mold trays from the first conveyor segment. The second conveyor segment can include a first rotatable shaft with a first helical channel formed therein that is sized and configured to receive a first tab of a respective one of the confection mold trays. With the first tab in the first helical channel, rotation of the rotatable shaft continuously advances the respective one of the confection mold trays in the first direction. This continuous advancement helps to prevent spilling of the confection during cooling and/or hardening thereof.

In some embodiments, the second conveyor also includes a second rotatable shaft with a second helical channel formed therein. The second rotatable shaft can be laterally spaced apart from and parallel to the first rotatable shaft. The first and second rotatable shafts can cooperatively move the confection mold trays along the second conveyor segment, thereby stabilizing the confection mold trays thereon and reducing the chance of the rotatable shafts being contaminated with spilled confection. Furthermore, because the first and second rotatable shafts are located on either side of the confection mold trays, this reduces the chances of confection from the confection mold trays to spill and land on these rotating parts, thereby avoiding part contamination with the confection.

Additionally or alternatively, a second aspect of the present disclosure includes the first and second conveyor segments described above, and additionally includes one or more of the confection mold trays. Each of the confection mold trays can have a top surface delimited by a first edge and at least one mold cavity formed therein, as well as a bottom surface opposite the top surface. Furthermore, the confection mold trays can include the first tab protruding from the first edge. The confection mold trays can each be conveyed along the first and second conveyor segments described above, first intermittently along the first conveyor segment, followed by continuous conveying along the second conveyor segment.

A third aspect of the present disclosure is a confection mold tray conveying method including a step of conveying one or more of the confection mold trays along the first conveyor segment and a step of continuously advancing the one or more confection mold trays along the second conveyor segment. Additionally, the method can include a step of filling confection-receiving cavities of the one or more confection mold trays with confection while the first pusher bar is translated in the second direction and the one or more confection mold trays are at rest on the first conveyor segment. The method can also include a step of cooling the confection in the cavities of the one or more confection mold trays while the one or more confection mold trays continuously advance along the second conveyor segment.

FIG. 1 provides a side perspective view of a confection mold tray conveying system 10 in accordance with aspects described herein. Specifically, the system 10 can include one or more confection mold trays 12, at least one structural frame 14, a destacking system 16, a first conveyor segment 18, a second conveyor segment 20, a third conveyor segment 22, and/or a stacking system 24. Furthermore, the system 10 can include a filling apparatus 26 located above the first conveyor segment 18 for filling the confection mold trays 12 with confection ingredients or liquefied confection.

As depicted in FIGS. 2A-2E, the confection mold trays 12 can each comprise a top surface 28 delimited by a first edge 30 and having one or more mold cavities 32 formed therein. The confection mold trays 12 can also each have a bottom surface 34 opposite the top surface 28, as well as a first tab 36 protruding from the first edge 30 and/or a second tab 38 protruding from the first edge 30. For example, the first tab 36 and the second tab 38 can be located at opposing ends of one of the confection mold trays 12. In some aspects, the confection mold trays 12 have spacers extending upward and/or downward from the top surface 28 and/or the bottom surface 34, respectively. The spacers create space between the confection mold trays 12 when they are vertically stacked, thus allowing for an air gap where air or cool air can flow between the confection mold trays 12 for continued cooling of the confection therein after re-stacking of the confection mold trays 12.

Figure 2A:
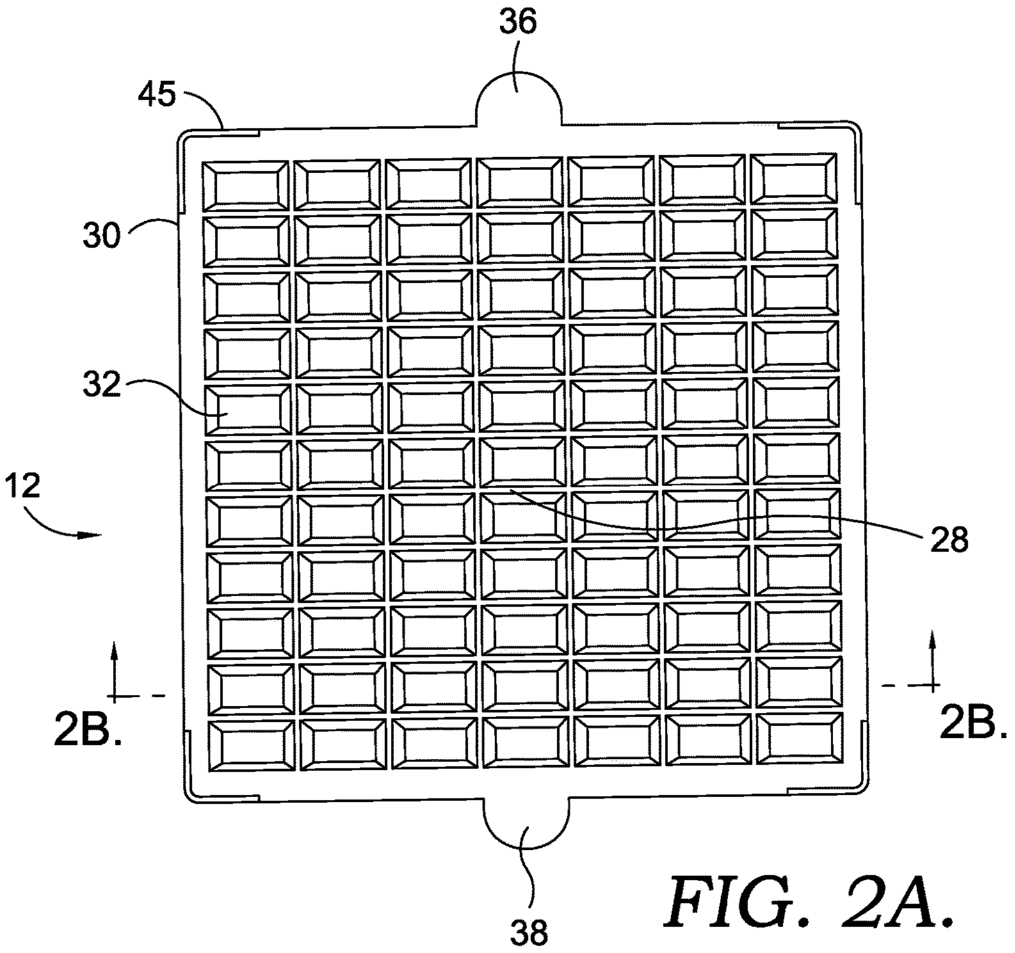
FIGS. 2A-2E depict various views of a confection mold tray of the confection mold conveying system of FIG. 1, in accordance with aspects herein.
Figure 2B:
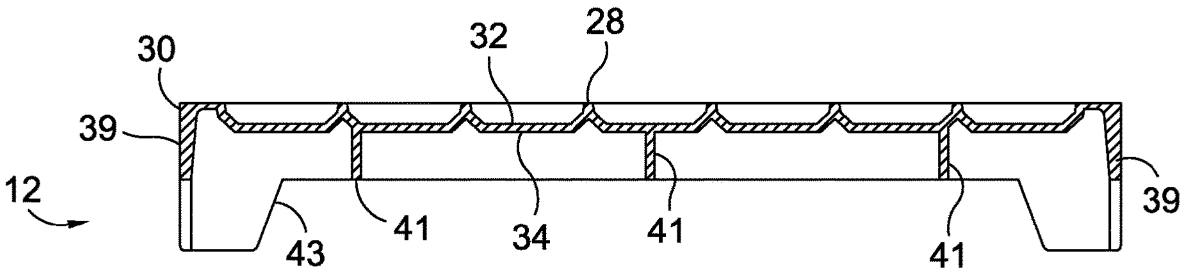
Figure 2C:
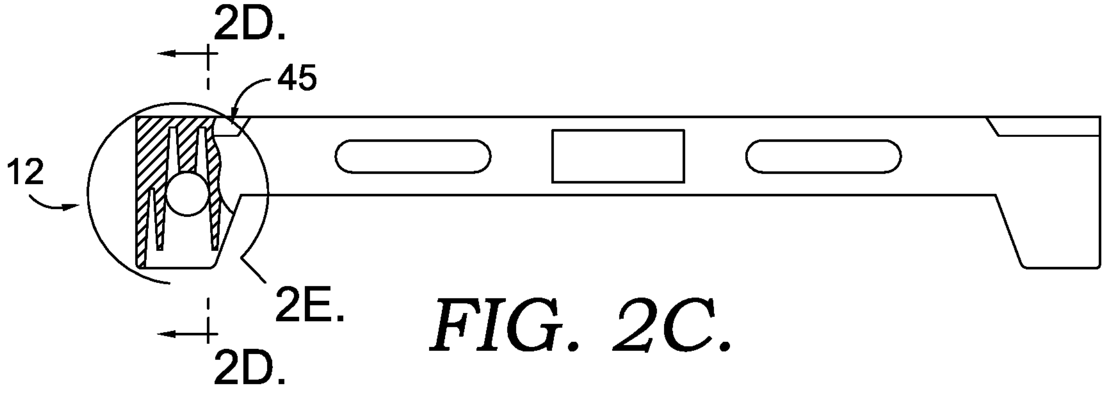
Figure 2D:
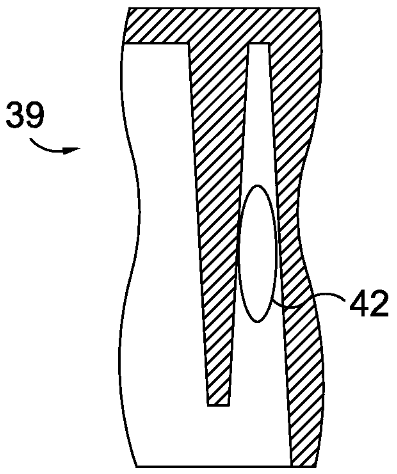
Figure 2E:
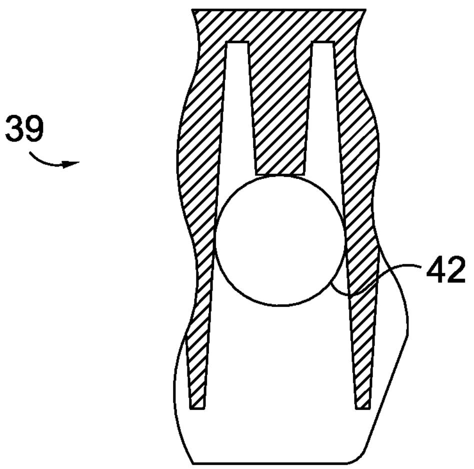
Figure 3A:
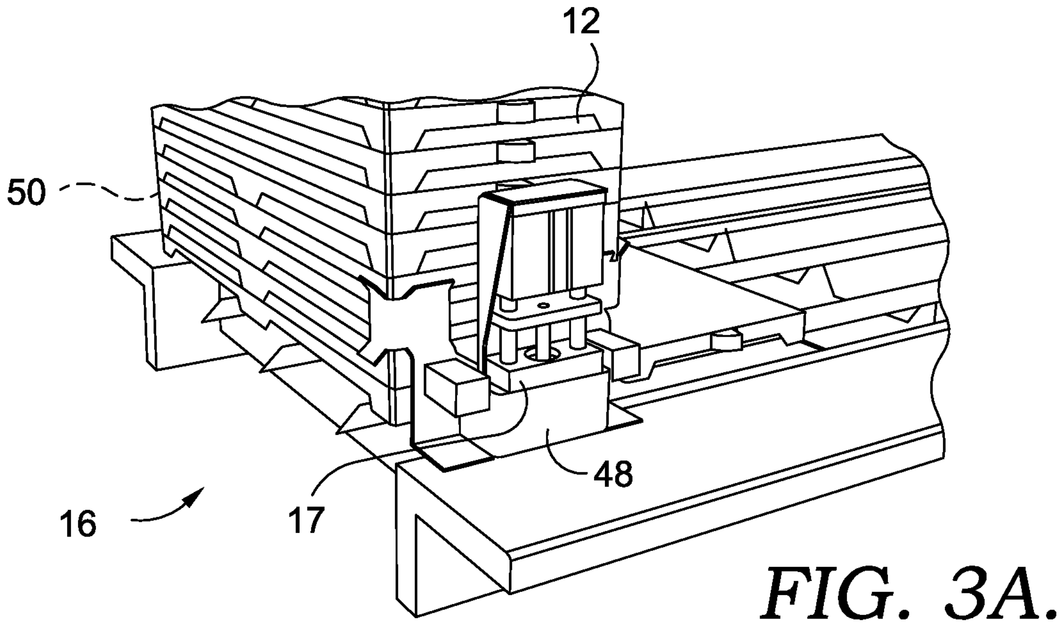
FIGS. 3A-3E depict various views of a destacking system of the confection mold conveying system of FIG. 1 in various stages of actuation, in accordance with aspects herein.
Figure 3B:
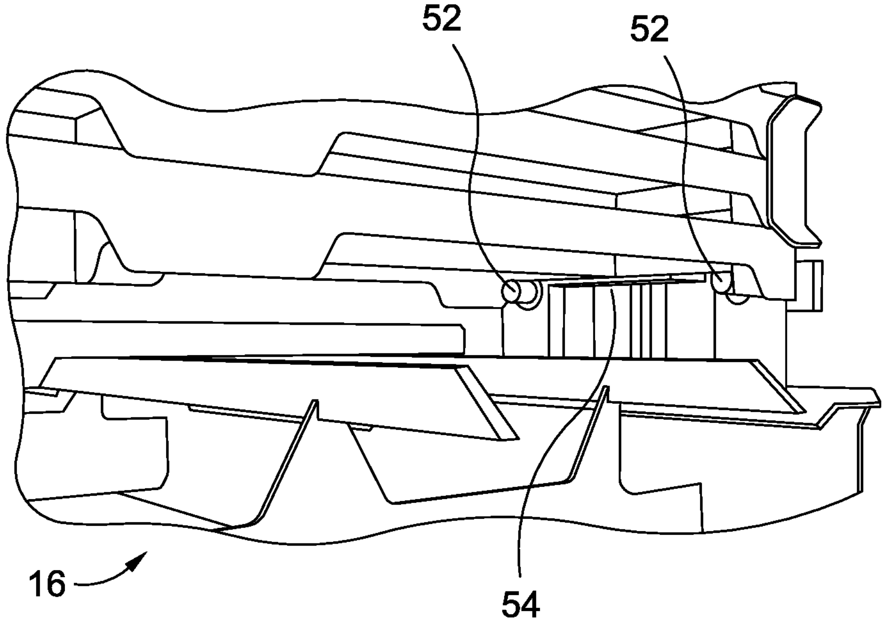
Figure 3C:
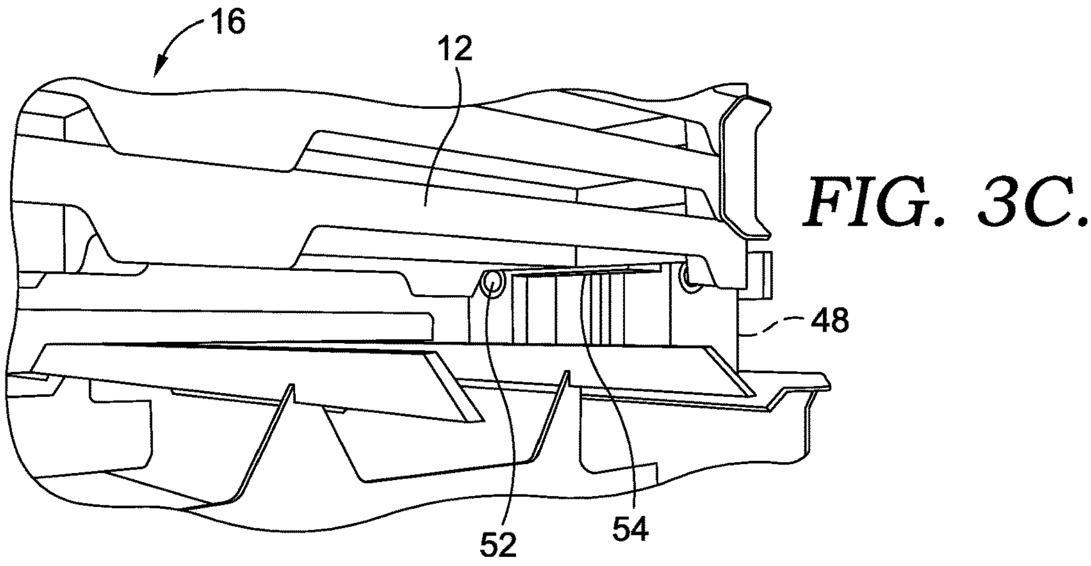
Figure 3D:
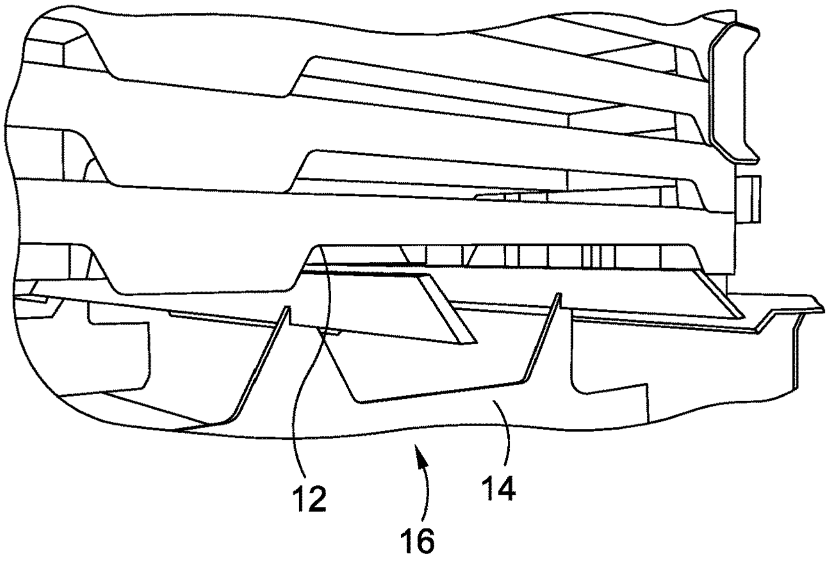
Figure 3E:
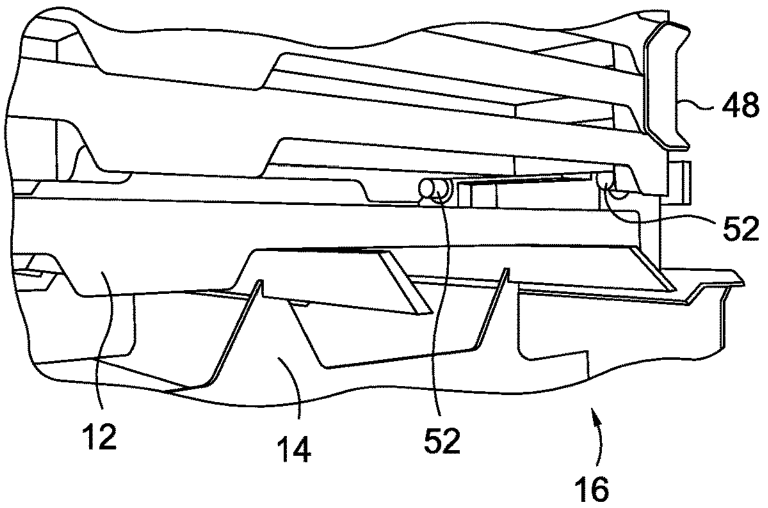

In some aspects, the spacers can be legs extending downward and integral with the bottom surface 34, as depicted in FIGS. 2B and 2C. FIG. 2B provides a cross-sectional view of the mold tray 12, while FIG. 2C provides a side view of the mold tray 12. The legs can include opposing end legs 39 and support legs 41 spaced apart between the end legs 39 as depicted in FIG. 2B. Each of the end legs 39 and support legs 41 can have a chamfered end 43. Each of the end legs 39 and the support legs 41 can also include recessed edges that taper toward the chamfered ends to provide an additional volume of air in the air gap. In one example aspect, the confection mold trays 12 include corner recesses 45 at each corner thereof, sized and configured to receive one or more of the spacers or end legs 39 of another one of the confection mold trays 12 when vertically stacked therewith. In some aspects, the confection mold trays 12 can comprise an identification item 42, such as a bar code or a QR code on a surface thereof, or an RFID tag within one or more of the legs or between two segments of at least one of the legs, as depicted in FIGS. 2D and 2E. This identification item 42 can allow scanning and tracking of one or more of the confection mold trays 12, such as what stage in the confection manufacturing process each of the confection mold trays 12 have reached.

As depicted in FIG. 1, the structural frame 14 can include a rigid frame and/or platform supporting the first, second, and third conveyor segments 18, 20, 22, as well as other elements of the system 10. For example, a plurality of legs 44 can support one or more support beams 46, and the support beams 46 can support any of the first, second, and third conveyor segments 18, 20, 22, the destacking system 16, and/or the stacking system 24. Furthermore, some portions of the legs 44 or additional frame portions extending upward from the support beams 46 can support the filling apparatus 26 above the first conveyor segment 18.

Figure 5:
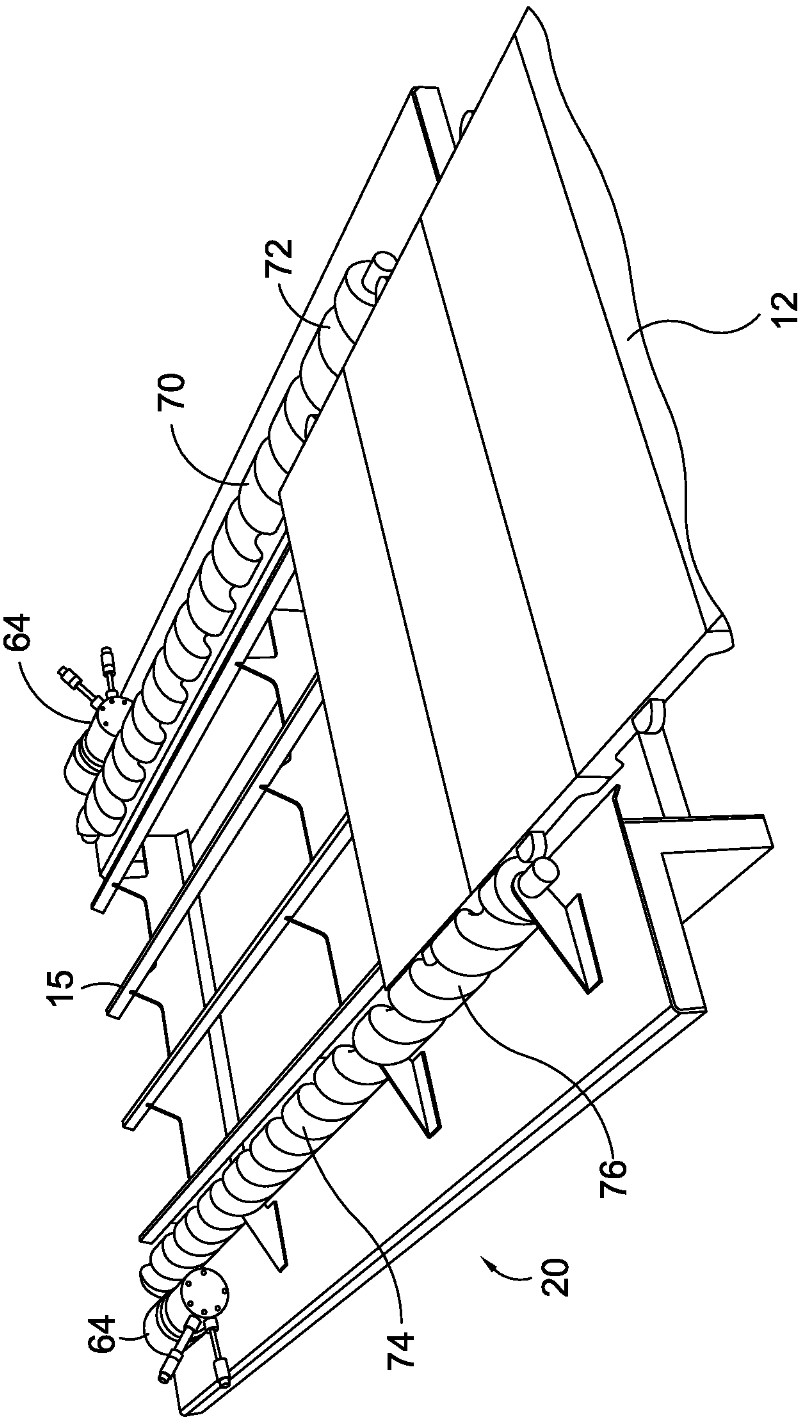
FIG. 5 depicts a perspective view of a second conveyor segment of the confection mold conveying system of FIG. 1, in accordance with aspects herein.
Figure 6A:
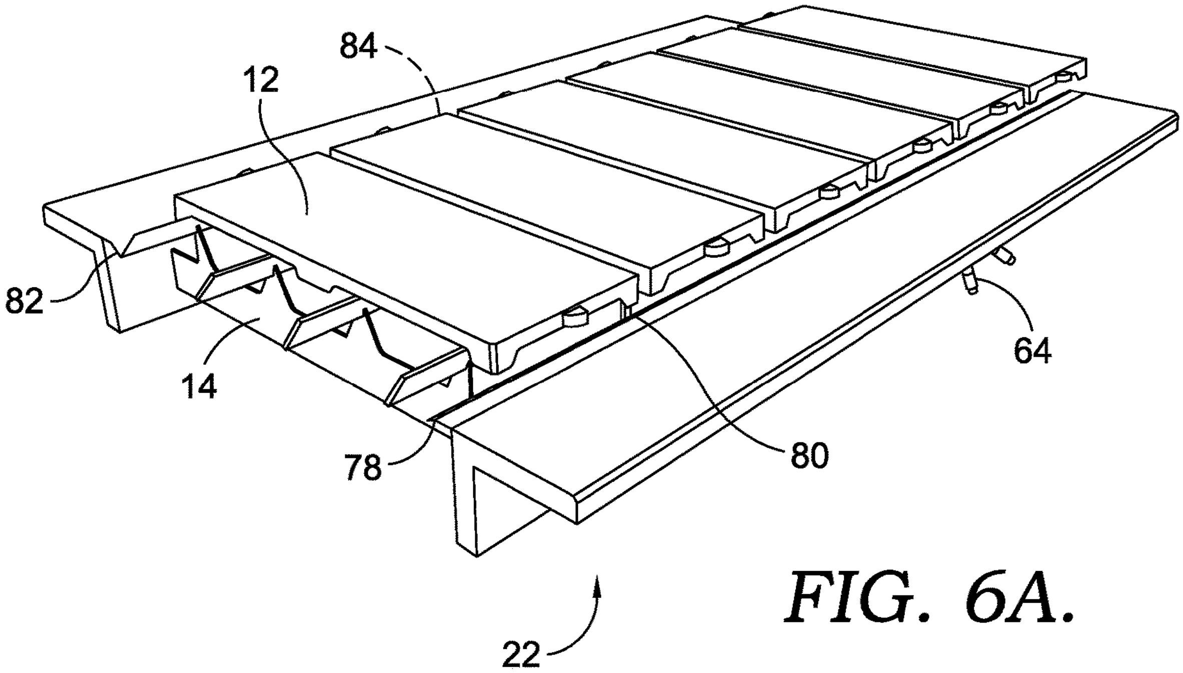
FIGS. 6A-6D depict various views of a third conveyor segment of the confection mold conveying system of FIG. 1 in various stages of actuation, in accordance with aspects herein.
Figure 6B:
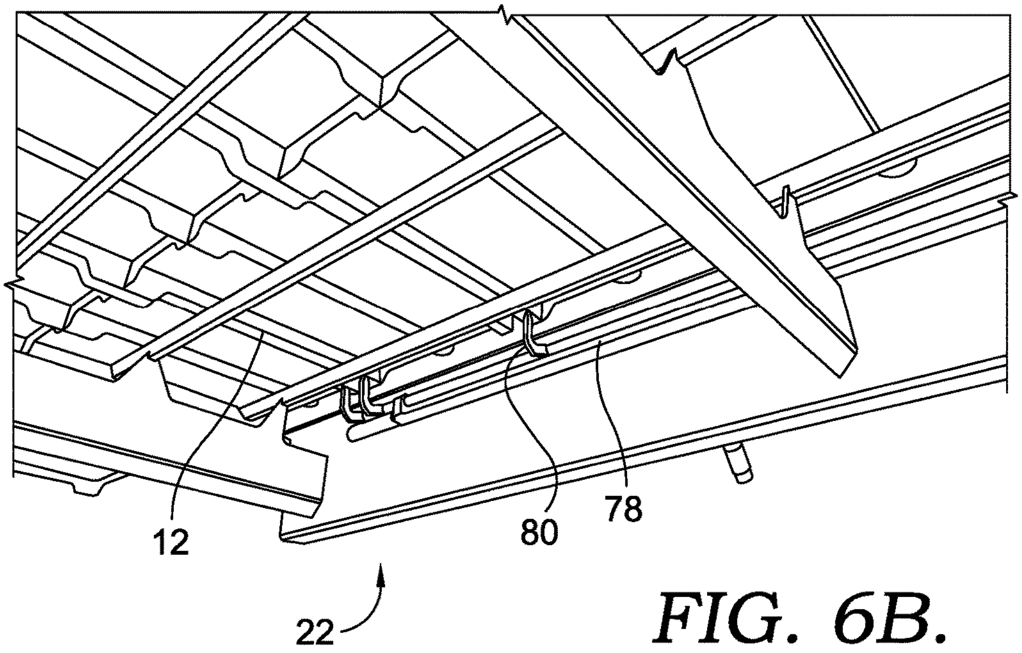
Figure 6C:
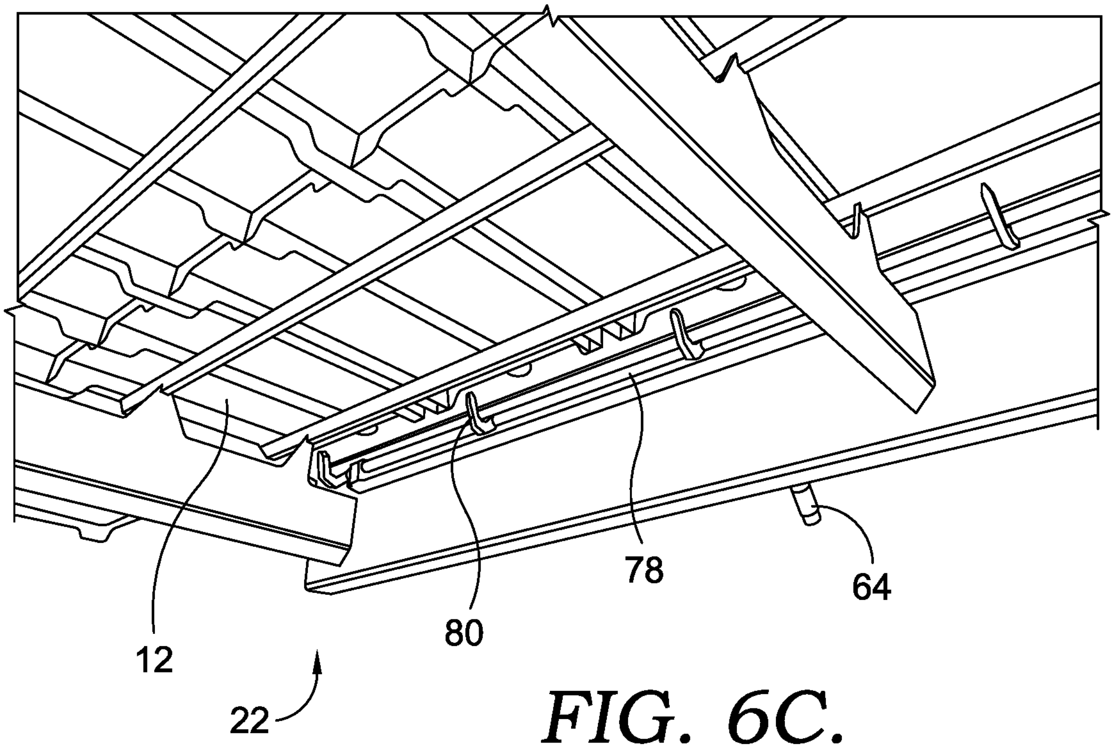
Figure 6D:
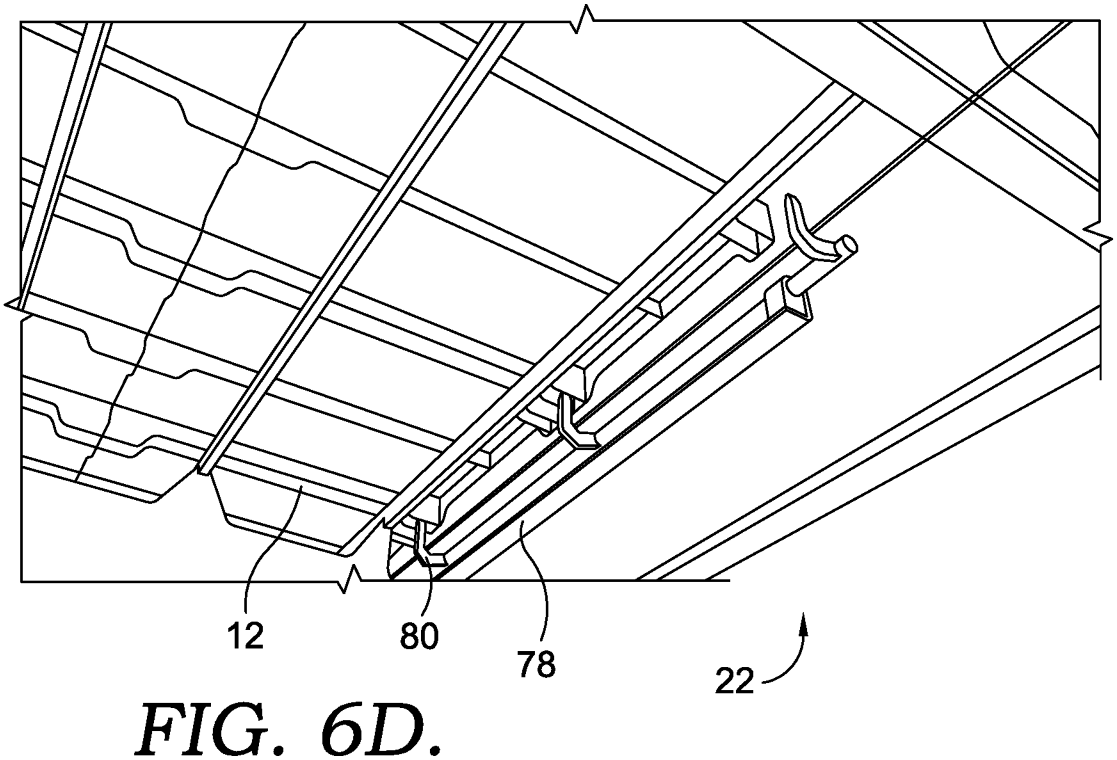
Figure 7A:
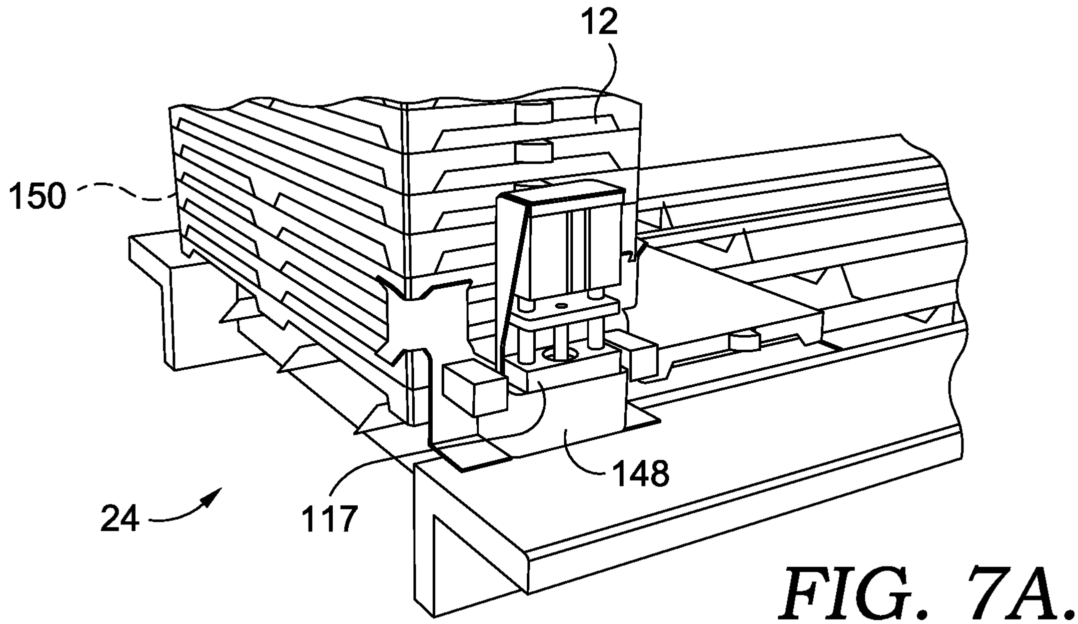
FIGS. 7A-7E depict various views of a stacking system of the confection mold conveying system of FIG. 1 in various stages of actuation, in accordance with aspects herein.
Figure 7B:
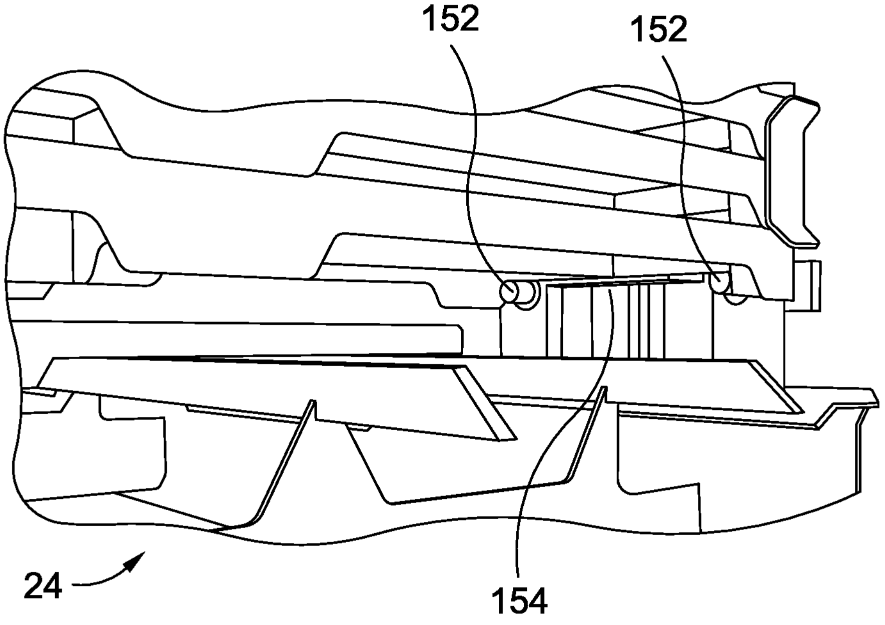
Figure 7C:
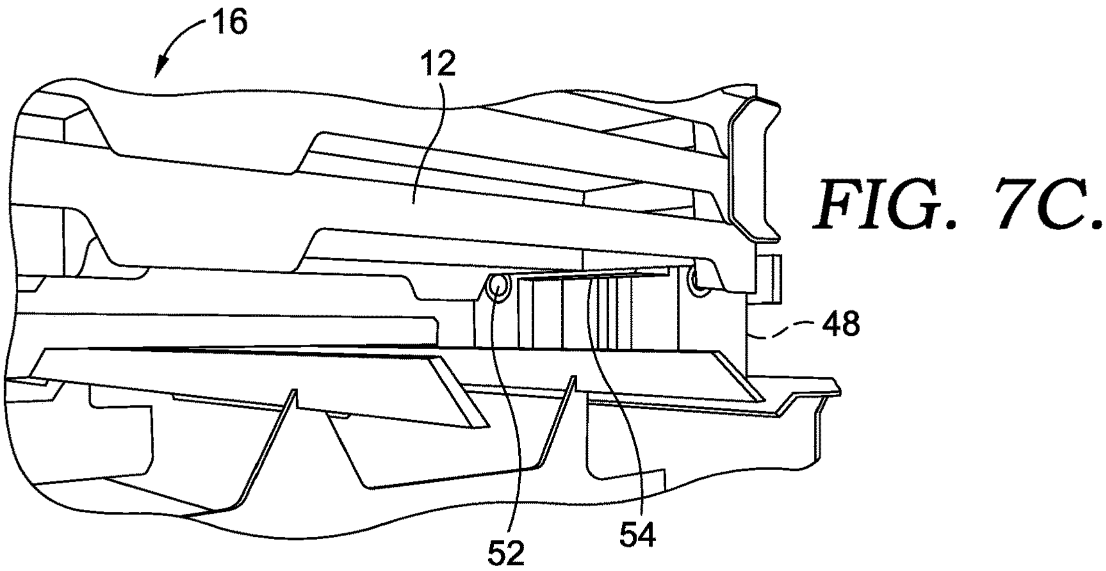
Figure 7D:
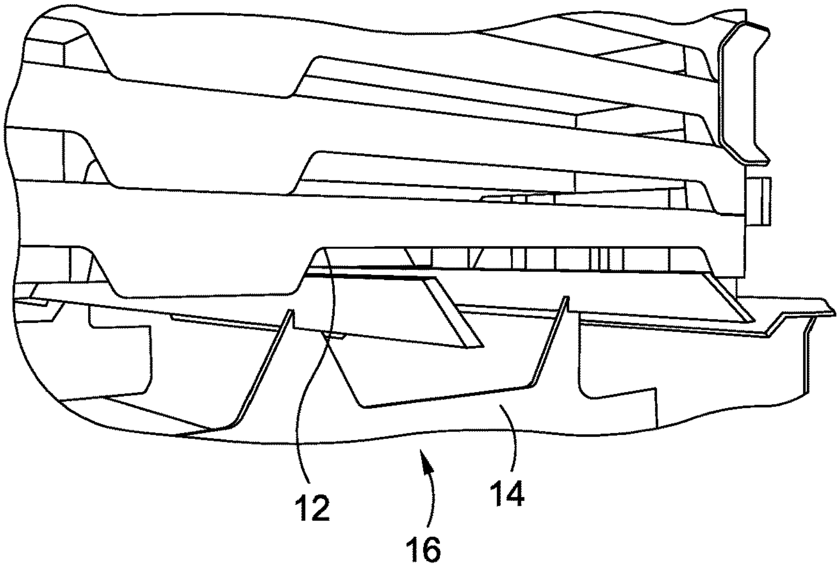
Figure 7E:
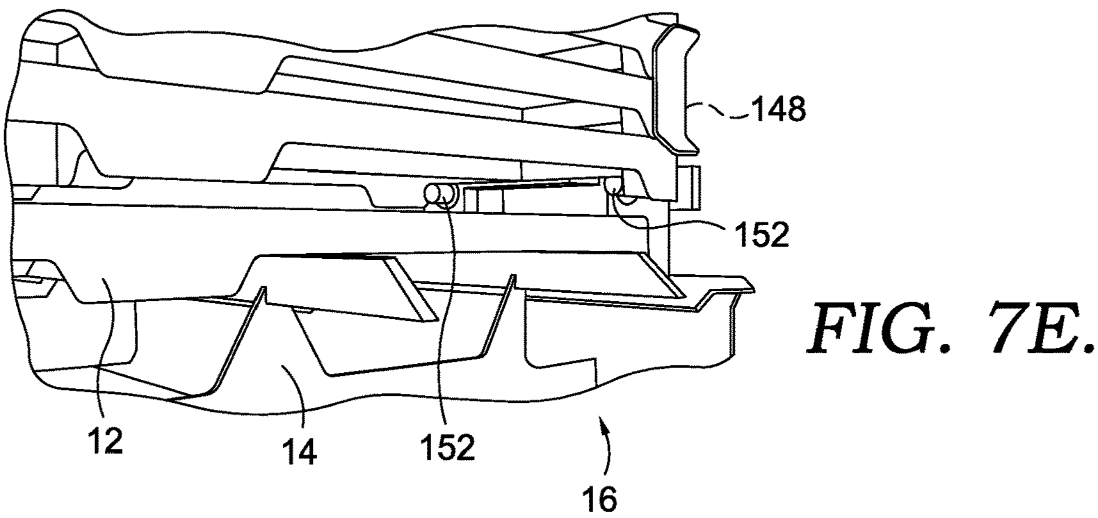

In some aspects, the support beams 46 can include any plurality of fixed rails 15 extending throughout the first, second and/or third conveyor segments 18, 20, 22, upon which the confection mold trays 12 can be supported and can slide thereon during conveyance of the confection mold trays 12 described herein (as can be seen in FIG. 5).

Some embodiments can include rollers, roller decks, or other such structures configured for allowing movement of the confection mold trays 12 along the various conveyor segments. Additionally, the structural frame 14 can be mounted on wheels or rollers and can be a modular system, such that various components or conveyor segments can be separated or reordered for various purposes without departing from the scope of the technology herein.

As depicted in FIG. 1, the destacking system 16 can be aligned with the first conveyor segment 18 in a machine direction and is positioned for transitioning a vertical stack of the confection mold trays 12 to a series of horizontally aligned confection mold trays 12 on the first conveyor segment 18. One aspect of the destacking system 16 is depicted in FIGS. 3A-3E. For example, the destacking system 16 can be a pneumatic or servo driven destacking system that raises and/or lowers the vertical stack of the confection mold trays 12 and actuates or pushes one of the confection mold trays 12 onto the first conveyor segment 18 at a predetermined rate and/or a rate corresponding with a rate of intermittent conveyance occurring via the first conveyor segment 18. Alternatively, as depicted in FIGS. 3A-3E, the destacking system 16 can maintain the vertical stack of the confection mold trays 12 on, above, or at a start of the first conveyor segment 18, releasing a bottom one of the confection mold trays 12 to the first conveyor segment 18 at a rate corresponding with a rate of intermittent conveyance occurring via the first conveyor segment 18.

The destacking system 16 comprises one or more actuation devices 17. In an implementation, the destacking system 16 comprises two actuation devices, including actuation device 17, at each lateral side of the conveying system 10, each of which facilitates positioning mold trays 12 onto the first conveyor segment 18. In another implementation, either or both of the lateral sides of the conveying system 10 further comprises a vertical actuation device positioned vertically relative to actuation device 17 illustrated in the figures, such as FIG. 3A. The vertical actuation device positions the mold trays 12 vertically within the vertical stack. This configuration allows for positioning a portion of the mold trays 12 of the vertical stack at a first vertical position, while a second portion of the mold trays 12 is positioned by the actuation device 17 along the first conveyor segment 18. This optional configuration provides additional support to the mold trays in the vertical stack, thus reducing the force, from the mass of the mold trays 12, that is experienced by components of the conveying system 10 that move the mold trays 12 on and along the first, second, and third conveyor segments 18, 20, 22. The one or more actuation devices 17 may position the vertically translating ledges 54, as are further described below.

As depicted in FIGS. 3A-3E, the destacking system 16 can have two upward support rails 48, 50 on opposing ends of the confection mold trays 12. The upward support rails 48, 50 can have retractable holding features 52, such as one or more short bars that extend outward between a bottom one of the confection mold trays 12 and a second-to-bottom one of the confection mold trays 12 and then retract inward releasing the confection mold trays 12 stacked thereon. In cooperation with these retractable holding features 52, the destacking system 16 can also include one or more vertically translating ledges 54 can translate upward to a short distance below the retractable holding features 52 and catch the vertical stack of confection mold trays 12 beneath the bottom one of the confection mold trays 12 when the retractable holding features 52 retract. Then, the retractable holding features 52 can extend back outward between the bottom one of the confection mold trays 12 and the second-to-bottom one of the confection mold trays 12 and the vertically translating ledges 54 can vertically lower only the bottom one of the confection mold trays 12 down to the first conveyor segment 18 for conveyance thereby. Once the bottom one of the confection mold trays 12 is conveyed out from under the vertical stack of confection mold trays 12, the second-to-bottom one of the confection mold trays 12 becomes the bottom one of the confection mold trays 12 and the vertically translating ledges 54 are vertically raised or translated upward to a point just below the retractable holding features 52 to begin the process again. The vertical translation and/or the extending and retracting described in this aspect of the destacking system 16 can be provided via hydraulic actuation, motors, or any automated actuation techniques known in the art.

As depicted in FIGS. 4A-4D, the first conveyor segment 18 can comprise a first pusher bar 56 and a series of spaced apart first pusher fingers 58 extending from the first pusher bar 56. The first pusher bar 56 can be an elongated rigid element extending along a length of the first conveyor segment 18. The first pusher bar 56 can be offset from a midline of the first conveyor segment 18, such as at or proximate to a left or right side edge of the first conveyor segment 18, such that confection spilling aftward as the confection mold trays 12 move or spilling between the confection mold trays 12 does not land on the first pusher bar 56 nor the first pusher fingers 58 thereof. The first pusher fingers 58 can extend laterally from the first pusher bar 56 (i.e., in a direction toward the midline of the first conveyor segment 18) and can include engagement portions, tabs, protrusions, hooks, or other configurations to mate with or abut the confection mold trays 12. Specifically, the first pusher fingers 58 can each be oriented to engage one or more of the confection mold trays 12 while the first pusher bar 56 is translated in a first direction, as labeled by an arrow 60 in FIG. 1. The first pusher fingers 58 can also each be oriented to avoid engagement with the one or more confection mold trays 12 while the first pusher bar 56 is translated in a second direction (as labeled by an arrow 62 in FIG. 1) that is opposite the first direction. The first and second directions can be directions corresponding to travel along a length of the first, second, and third conveyor segments 18, 20, 22.

Figure 4A:
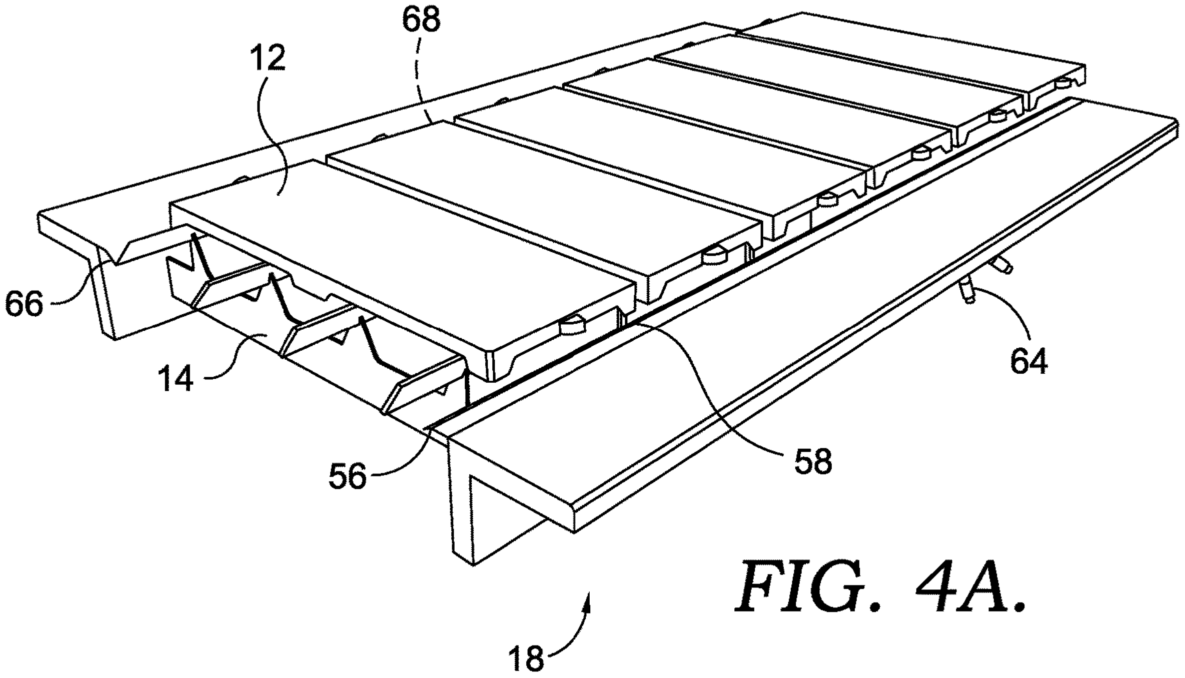
FIGS. 4A-4D depict various views of a first conveyor segment of the confection mold conveying system of FIG. 1 in various stages of actuation, in accordance with aspects herein.
Figure 4B:
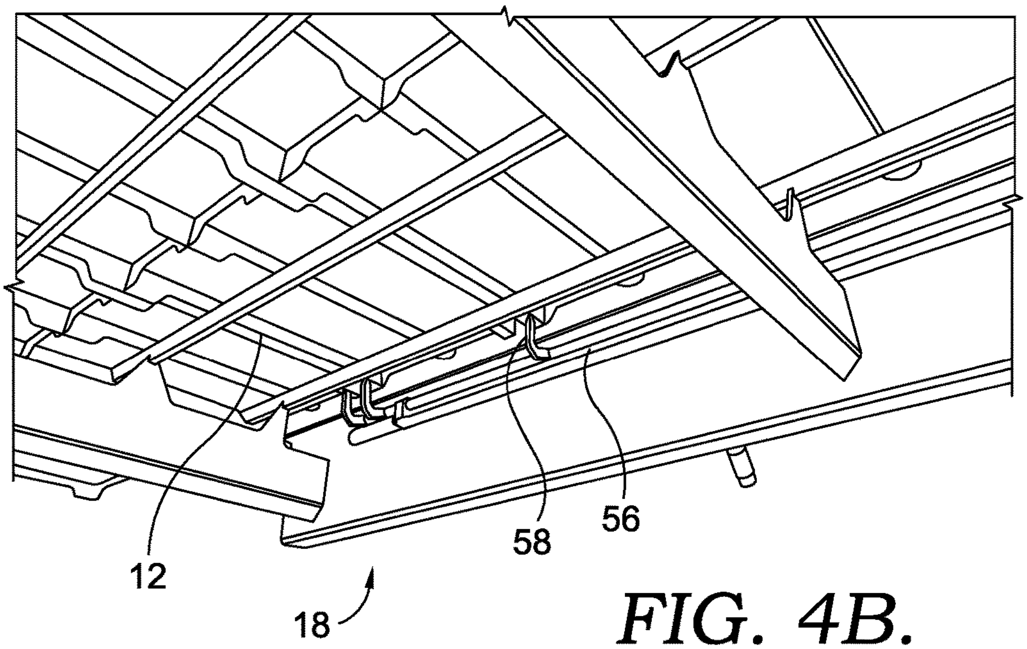
Figure 4C:
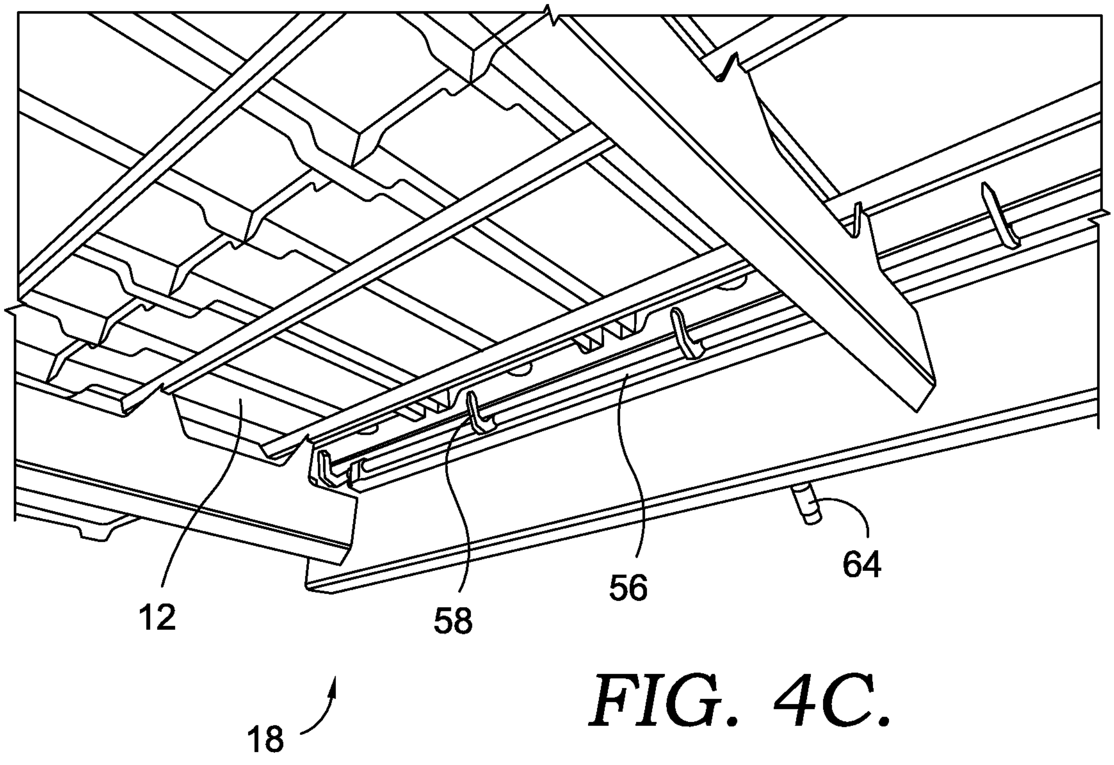
Figure 4D:
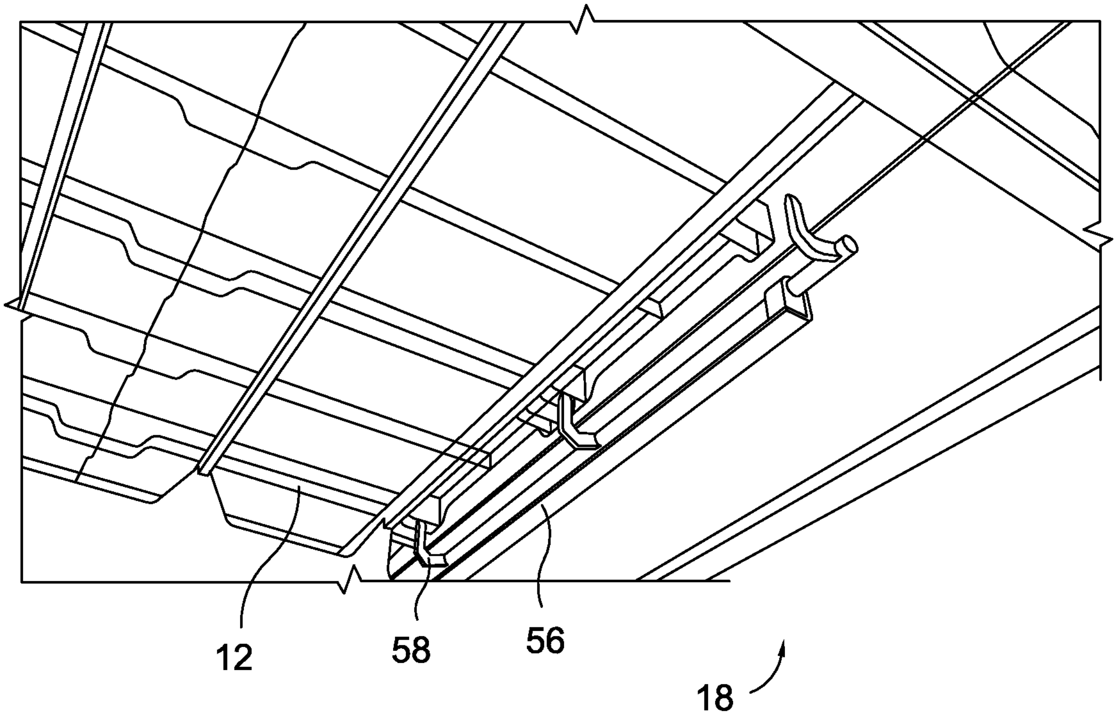

For example, as depicted in FIGS. 4A-4D, the first conveyor segment 18 can comprise one or more motors or actuators 64 coupled to the first pusher bar 56 and operable to translate the first pusher bar 56 in the first direction and then back in the second direction. Furthermore, at least some of the one or more motors or actuators 64 can be configured to actuate the first pusher fingers 58 into a first orientation, as depicted in FIG. 4B, and maintain the first pusher fingers 58 in the first orientation while the first pusher bar 56 is actuated in the first direction. Likewise, at least some of the one or more motors or actuators 64 can be configured to actuate the first pusher fingers 58 into a second orientation, as depicted in FIG. 4C, and maintain the first pusher fingers 58 in the second orientation while the first pusher bar 56 is actuated in the second direction. The first orientation places the first pusher fingers 58 into contact with one or more of the confection mold trays 12 on the first conveyor segment 18 while the first pusher bar 56 is translated in the first direction. Likewise, the second orientation allows the first pusher fingers 58 to avoid contact with the confection mold trays 12 on the first conveyor segment 18 while the first pusher bar 56 is translated in the second direction. Because the first pusher fingers 58 are not in contact with the confection mold trays 12 while the first pusher bar 56 is translated in the second direction, the confection mold trays 12 are at rest while the first pusher bar 56 is translated in the second direction.

In one aspect, as depicted in FIGS. 4A-4D, the first pusher bar 56 is actuated by motors or actuators (such as actuators 64) to be lifted vertically to engage the first pusher fingers 58 with the confection mold trays 12 and then translated in the first direction. Likewise, the first pusher bar 56 is actuated by motors or other actuators to be lowered vertically to disengage the first pusher fingers 58 with the confection mold trays 12 as the first pusher bar 56 is translated back in the second direction. That is, the motion of the first pusher bar 56 can be a vertical lift to a raised position (placing the first pusher fingers in the first orientation), followed by a motion in the first direction to advance the confection mold trays 12, followed by a vertical drop to a lowered position (placing the first pusher fingers 58 in the second orientation), and then finally a return motion in the second direction, while in lowered position, returning the first pusher bar 56 to its starting point.

In an alternative aspect, the first pusher bar 56 is both rotatable about its axis and translatable, such that rotating the first pusher bar 56 in a first rotatable direction places the first pusher fingers 58 attached thereto into the first orientation described above, while rotating the first pusher bar 56 in a second rotatable direction places the first pusher fingers 58 attached thereto into the second orientation described above. For example, rotating the first pusher bar 56 in the first rotatable direction can orient the first pusher fingers 58 attached thereto further upward to engage the confection mold trays 12 while traveling in the first direction, while rotating the first pusher bar 56 in the second rotatable direction can orient the first pusher fingers 58 attached thereto further downward to avoid engaging the confection mold trays 12 while traveling in the second direction.

In yet another alternative aspect, individual actuators or motors can be associated with one or more of the first pusher fingers 58 and can extend the first pusher fingers 58 up and down between the first orientation and the second orientation or can pivot the first pusher fingers 58 themselves between the first orientation and the second orientation without pivoting or vertical translation of the first pusher bar 56. Other configurations for intermittently engaging the first pusher fingers 58 with the confection mold trays 12 and intermittently disengaging the first pusher fingers 58 with the confection mold trays 12 can be used without departing from the scope of the technology described herein. Furthermore, the intermittent motion provided by the first conveyor segment 18 to the confection mold trays 12 occurs in this embodiment due to the return time of the first pusher bar 56 being moved back in the second direction while not engaged with any of the confection mold trays 12. However, other configurations for intermittently moving the confection mold trays 12 can be used in the first conveyor segment 18 without departing from the scope of the technology here.

In some aspects, the first conveyor segment 18 can further include a second pusher bar 66 having a series of spaced apart second pusher fingers 68 extending therefrom. The second pusher bar 66 can be offset from the midline of the first conveyor segment 18, such as at or proximate to a left or right side edge of the first conveyor segment 18 opposite the first pusher bar 56. As with the first pusher bar 56, this offset location of the second pusher bar 66 can prevent confection spilling onto the second pusher bar 66 and/or the second pusher fingers 68, such as if confection drips or is spilled between the confection mold trays 12. The second pusher bar 66 and the second pusher fingers 68 can each operate substantially identical to and function cooperatively in tandem with the first pusher bar 56 and the first pusher fingers 58. In some aspects, the second pusher bar 66 can be spaced apart from the first pusher bar 56 in a direction perpendicular to the first direction and the second direction. As with the first pusher bar 56 and the first pusher fingers 58, the second pusher fingers 68 can each be oriented to engage with the one or more confection mold trays 12 while the second pusher bar 66 is translated in the first direction, and the second pusher fingers 68 can each be oriented to avoid engagement with the confection mold trays 12 while the second pusher bar 66 is translated in the second direction. However, note that any number of pusher bars and pusher fingers can be included in the first conveyor segment 18 without departing from the scope of the technology described herein. For example, some aspects can include three, four, or five parallel pusher bars and associated pusher fingers for cooperatively translating the confection mold trays 12 on the first conveyor segment 18.

In terms of a relative position of the first conveyor segment 18, note that the destacking system 16 can be aligned immediately above and/or aligned in the second direction with the first conveyor segment 18, and the second conveyor segment 20 can be aligned in the first direction with the first conveyor segment 18, as depicted in FIG. 1. Furthermore, the first conveyor segment 18 is positioned to receive a plurality of the confection mold trays 12 in horizontal alignment, intermittently translate them thereby, and then to push the confection mold trays 12 (via the intermittent translation described above) onto or into engagement with the second conveyor segment 20 for conveyance thereby.

Specifically, as depicted in FIG. 5, the second conveyor segment 20 can be a screw shaft conveyor system or the like and can include a first rotatable shaft 70 with a first helical channel 72 formed therein that is sized and configured to receive the first tab 36 of a respective one of the confection mold trays 12 (as illustrated in FIG. 2A). As with the first and second pusher bars 56, 66 above, the first rotatable shaft 70 can be offset from a midline of the second conveyor segment 20, such as at or proximate to a left or right side edge of the second conveyor segment 20, and this offset location can prevent confection spilling onto the first rotatable shaft 70 and/or the first helical channel 72 thereof, such as if confection drips or is spilled between the confection mold trays 12 or aftward thereof.

Rotation of the first rotatable shaft 70 is thereby configured to continuously advance the confection mold trays 12 thereon in the first direction. Likewise, the second conveyor segment 20 can include a second rotatable shaft 74 with a second helical channel 76 formed therein that is sized and configured to receive the second tab 38 of the respective one of the confection mold trays 12. As with the first rotatable shaft 70 above, the second rotatable shaft 74 can be offset from the midline of the second conveyor segment 20, such as at or proximate to the left or right side edge of the second conveyor segment 20 opposite the first rotatable shaft 70. Similarly, this offset location can prevent confection spilling onto the second rotatable shaft 74 and/or the second helical channel 76 thereof, such as if confection drips or is spilled between the confection mold trays 12 or aftward thereof. Rotation of the second rotatable shaft 74 is likewise configured to continuously advance the confection mold trays 12 in the first direction cooperatively with rotation of the first rotatable shaft 70. The first and second rotatable shafts 70, 74 are mechanically or communicably linked to rotate at substantially identical rates in order to cooperatively translate the confection mold trays 12 thereby.

As depicted in FIGS. 6A-6D, the third conveyor segment 22 can be aligned in the first direction with the second conveyor segment 20 and can include components substantially identical to the components of the first conveyor segment 18. Specifically, the third conveyor segment 22 can comprise a third pusher bar 78 and a series of spaced apart third pusher fingers 80 extending from the third pusher bar 78. The third pusher bar 78 can be offset from a midline of the third conveyor segment 22, such as at or proximate to a left or right side edge of the third conveyor segment 22, such that confection spilling aftward as the confection mold trays 12 move or spilling between the confection mold trays 12 does not land on the third pusher bar 78 nor the third pusher fingers 80 thereof. The third pusher fingers 80 can extend laterally from the third pusher bar 78 (i.e., in a direction toward the midline of the third conveyor segment 22). The third pusher bar 78 and the third pusher fingers 80 can be identical or equivalent to the first and second pusher bars 56, 66 and the first and second pusher fingers 58, 68 described above. That is, the third pusher fingers 80 can each be oriented to engage the confection mold trays 12 while the third pusher bar 78 is translated in the first direction. Conversely, the third pusher fingers 80 can each be oriented to avoid engagement with the confection mold trays 12 while the third pusher bar 78 is translated in the second direction opposite the first direction.

In some aspects, the third conveyor segment 22 can also comprise a fourth pusher bar 82 and a series of spaced apart fourth pusher fingers 84 extending from the fourth pusher bar 82, similar or identical to the second pusher bar 66 and the second pusher fingers 68 described above. The fourth pusher bar 82 can be offset from the midline of the third conveyor segment 22, such as at or proximate to a left or right side edge of the third conveyor segment 22, opposite the third pusher bar 78. In this configuration, confection spilling aftward as the confection mold trays 12 move or spilling between the confection mold trays 12 does not land on the fourth pusher bar 82 nor the fourth pusher fingers 84 thereof. The fourth pusher fingers 84 can extend laterally from the fourth pusher bar 82 (i.e., in a direction toward the midline of the third conveyor segment 22). Similar to the cooperation between the first and second pusher bars 56, 66 as described above, the third and fourth pusher bars 78, 82 can cooperatively move the confection mold trays 12 intermittently along the third conveyor segment 22 and to the stacking system 24. Furthermore, as with the first conveyor segment 18 described above, any additional number of parallel pusher bars and pusher fingers can be used along the third conveyor segment 22.

In one implementation, the first pusher bar 56 and the third pusher bar 78 are each a portion of a same first pusher bar system and operate as a single unit, while second pusher bar 66 and fourth pusher bar 82 are each a portion of a same second pusher bar system and operate as a single unit.

As depicted in FIGS. 7A-7E, the stacking system 24 is aligned in the first direction with the third conveyor segment 22 and positioned to receive the confection mold trays 12 conveyed from the third conveyor segment 22. The intermittent motion of the third conveyor segment 22 can advantageously allow the stacking system 24 to receive one of the confection mold trays 12 and have sufficient time to move the received confection mold tray 12 in an upwards or downwards direction prior to receiving a subsequent one of the confection mold trays 12 to be stacked therewith. In some aspects, the stacking system 24 can be a pneumatic or servo driven stacking system that raises and/or lowers a vertical stack of the confection mold trays 12 and receives one of the confection mold trays 12 to be added to the vertical stack at a predetermined rate and/or a rate corresponding with a rate of intermittent conveyance occurring via the third conveyor segment 22.

The stacking system 24 comprises one or more actuation devices 117. In an implementation, the destacking system 16 comprises two actuation devices, including actuation device 117, at each lateral side of the conveying system 10, each of which facilitates positioning mold trays 12 off of the third conveyor segment 22. In another implementation, either or both of the lateral sides of the conveying system 10 further comprise a vertical actuation device positioned vertically relative to actuation device 117 illustrated in the figures, such as FIG. 7A. The vertical actuation device positions the mold trays 12 vertically within the vertical stack. This configuration allows for positioning a portion of the mold trays 12 of the vertical stack at a first vertical position, while a second portion of the mold trays 12 is positioned by the actuation device 117 along the first conveyor segment 18. This optional configuration provides additional support to the mold trays in the vertical stack, thus reducing the force, from the mass of the mold trays 12, that is experienced by components of the conveying system 10 that move the mold trays 12 off of and along the first, second, and third conveyor segments 18, 20, 22. The one or more actuation devices 117 may position the vertically translating ledges 154, as are further described below.

In some aspects, as depicted in FIGS. 7A-7E, the stacking system 24 can maintain the vertical stack of the confection mold trays 12 on, above, or at an end of the third conveyor segment 22, conveying upward a bottom one of the confection mold trays 12 from the third conveyor segment 22 at a rate corresponding with a rate of intermittent conveyance occurring via the third conveyor segment 22. This aspect can operate in much the same manner as the destacking system 16 described above, except that the retractable holding features 152 and vertically translating ledges 154 operate in the reverse in the stacking system 24, such that the vertically translating ledges 154 raise a tray from the third conveyor segment 22 upward toward the vertical stack of the confection mold trays 12, then the retractable holding features 152 retract. At this point, the entire vertical stack of the confection mold trays 12 falls onto the confection mold tray supported by the vertically translating ledges 154, and the vertically translating ledges 154 raise the entire stack upward. Then the retractable holding features 52 extend outward below the entire vertical stack, including the one of the confection mold trays 12 that was lifted off of the third conveyor segment 22. Then the process repeats with the next one of the confection mold trays 12 received from the third conveyor segment 22.

The filling apparatus 26 can be any mechanism for pouring or otherwise dispensing confection into the confection mold trays 12. Specifically, the filling apparatus 26 can dispense confection into one or more mold cavities 32 of each of the confection mold trays 12 passing thereunder at intermittent intervals via the first conveyor segment 18. For example, the filling apparatus 26 can include heated and/or otherwise liquefied confection dispensed via one or more nozzles into the confection mold trays 12. The confection can be melted prior to being placed into the filling apparatus 26 and/or the filling apparatus 26 can comprise a heating mechanism to keep the confection in a liquefied form for dispensing. In alternative aspects, small granular pieces of a confection can be dispensed from the filling apparatus 26 into the confection mold trays 12 and then heated or melted within the confection mold trays to conform to the one or more mold cavities 32. In some embodiments, the filling apparatus 26 is mounted at a fixed location above the first conveyor segment. However, the filling apparatus 26 can also be actuatable to one or more different fill locations along the first conveyor segment 18. This can be accomplished via various motors, actuators, robotic components, or the like.

In some aspects, the system 10 further comprises motors or actuators (such as the actuators 64), sensors, and/or processors for automating and/or tracking various stages of the methods described herein. For example, the system 10 can comprise pneumatic or servo actuation systems for the destacking system 16 and/or the stacking system 24. Furthermore, the system 10 can comprise one or more motors for translating the pusher bars described above in both the first conveyor segment 18 and the third conveyor segment 22. Likewise, the system 10 can comprise motors for raising and lowering the pusher bars, rotating the pusher bars, or otherwise changing the orientation of the pusher fingers to avoid engagement with the confection mold trays when translated in the second direction. The system 10 can also comprise one or more rotary motors connected to the rotary shafts of the third conveyor segment 22 to continuously rotate the first and/or second rotary shafts. The system 10 can also comprise open/close switches or other mechanisms for selectively dispensing the confection via the filling apparatus 26. Furthermore, the system 10 can include cooling or heating mechanisms for melting the confection and/or hardening the confection during various method steps described herein.

In some aspects, the system 10 comprises sensors for scanning and tracking the confection mold trays 12 via the identification items of the confection mold trays 12 described above, such as the bar code or QR code on a surface thereof or the RFID tag. The system 10 can also include temperature sensors or the like. Furthermore, the system 10 can comprise a processor or other computing devices, such as the computing device 900 depicted in FIG. 9, for storing and executing various instructions and/or tracking data therein. The instructions can include, for example, rates at which the motors should actuate various components, when various components should be turned on or off, when dispensing of the confection should start and stop, tracking data regarding the confection mold trays 12, temperatures at which to maintain various aspects of the system 10, or the like.

Figure 8:
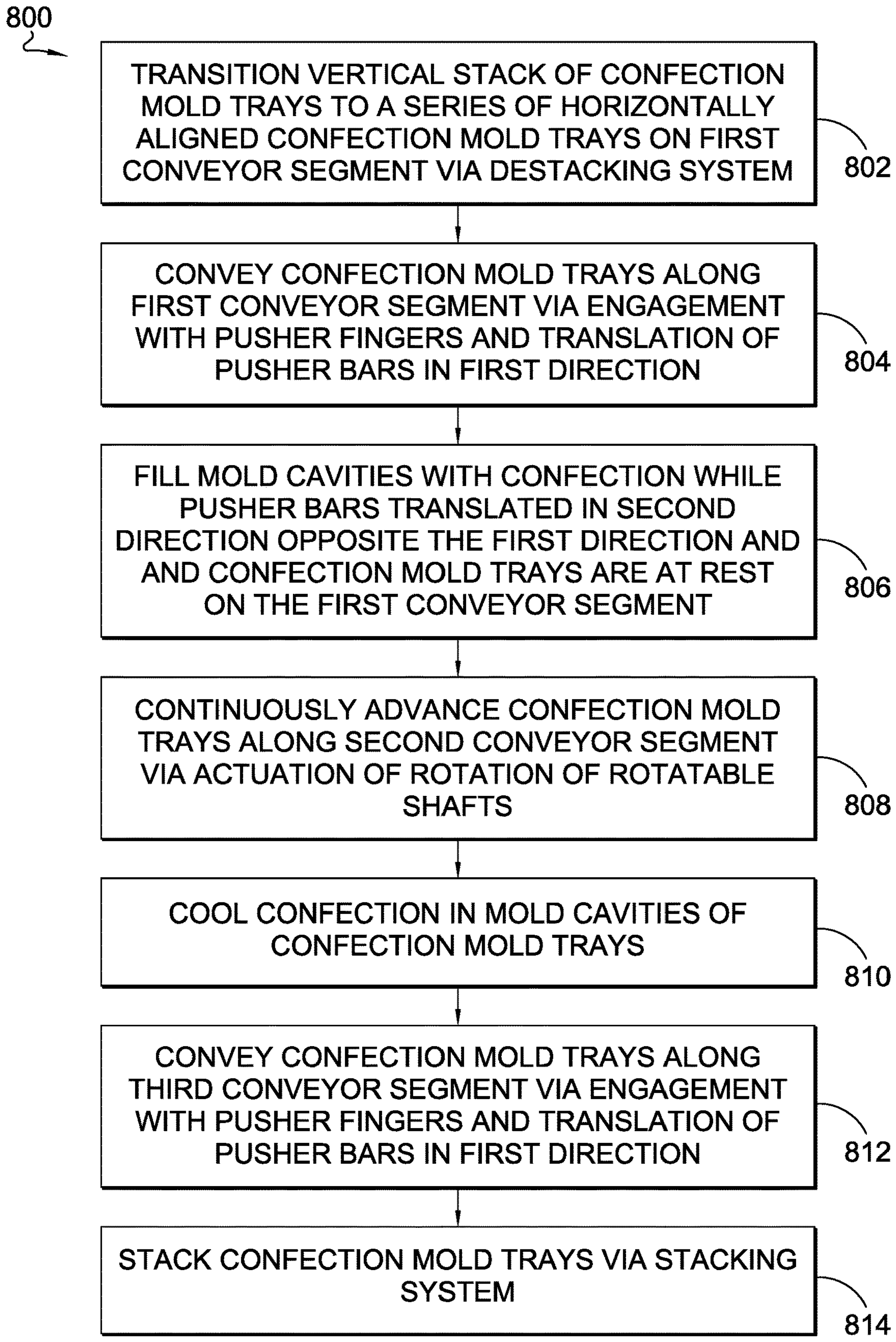
FIG. 8 depicts a flow diagram of an example methods for conveying confection mold trays, in accordance with aspects herein.

FIG. 8 depicts a flow diagram of an example method 800 for confection mold conveying and/or producing confections or other such moldable products via the system 10 described above, in accordance with aspects herein. At block 802, the method 800 can comprise a step of transitioning a vertical stack of the confection mold trays 12 to a series of horizontally aligned confection mold trays 12 on the first conveyor segment 18 via the destacking system 16. As noted above, the destacking system 16 is aligned in the second direction with the first conveyor segment 18. For example, the destacking system 16 can raise and/or lower (via pneumatic actuators or other types of actuators) the vertical stack of the confection mold trays 12 and then release, actuate, or push one of the confection mold trays 12 onto the first conveyor segment 18 at a predetermined rate and/or a rate corresponding with a rate of intermittent conveyance occurring via the first conveyor segment 18. Alternatively, the destacking system 16 can maintain the vertical stack of the confection mold trays 12 on, above, or at a start of the first conveyor segment 18, releasing a bottom one of the confection mold trays 12 to the first conveyor segment 18 at a rate corresponding with a rate of intermittent conveyance occurring via the first conveyor segment 18. However, other methods of destacking the confection mold trays 12 and/or placing a series of confection mold trays 12 onto the first conveyor segment 18 can be used without departing from the scope of the technology herein.

At block 804, the method 800 comprises conveying one or more of the confection mold trays 12 along the first conveyor segment 18 via engagement with the first pusher fingers 58 (and/or the second pusher fingers 68) and translation of the first pusher bar 56 (and/or the second pusher bar 66) in the first direction. This step can comprise, for example translating the first pusher bar 56 and/or the second pusher bar 66 in the first direction to a predetermined stopping point and then reorienting the first and/or second pusher fingers 58, 68 in a direction away from the confection mold trays 12 and translating the first pusher bar 56 and/or the second pusher bar 66 back in a second direction opposite the first direction. The confection mold trays 12 engaged by the first and/or second pusher fingers 58, 68 can be the horizontally aligned confection mold trays 12 dispensed onto the first conveyor segment 18 via the destacking system 16.

As described above, the first pusher fingers 58 and/or the second pusher fingers 68 can each be oriented to engage the confection mold trays 12 located on the first conveyor segment 18 while the first pusher bar 56 and/or the second pusher bar 66 is translated in the first direction, and then the first pusher fingers 58 and/or the second pusher fingers 68 can be re-oriented to avoid engagement with the confection mold trays 12 while the first pusher bar 56 and/or the second pusher bar 66 is translated in the second direction. Engagement of the first or second pusher fingers 58, 68 can occur at the first edge 30 and/or the bottom surface 34 of the confection mold trays 12. For example, having the first and second pusher fingers 58, 68 positioned to engage with the bottom surface 34 of the confection mold trays 12, instead of sides or top surfaces thereof, may limit exposure of the pusher fingers and/or the pusher bars to spilled confection during filling or conveying of the confection mold trays 12.

As described above, moving the first pusher fingers 58 and/or the second pusher fingers 68 between the first orientation and the second orientation can be accomplished in a number of different ways, including, but not limited to, rotating the first pusher bar 56 (and/or the second pusher bar 66) about its axis, independently actuating the first pusher fingers 58 (and/or the second pusher fingers 68), and/or otherwise shifting or translating the first pusher bar 56 (and/or the second pusher bar 66) upward prior to translation in the first direction and downward prior to translation in the second direction. The second pusher fingers 68 can be cooperatively moved between first and second orientations in an identical fashion as described for the first pusher fingers 58. Similar methods can be employed for any number of additional pusher bars and pusher fingers without departing from the scope of the technology described herein.

At block 806, the method 800 further comprises filling the mold cavities 32 of at least one of the confection mold trays 12 with confection while the first pusher bar 56 and/or the second pusher bar 66 is translated in the second direction and the at least one of the confection mold trays 12 is at rest on the first conveyor segment 18. Specifically, the filling apparatus 26 can be configured to dispense a predetermined amount of confection corresponding to the size of the mold cavities 32 to be filled. This dispensing can be timed or otherwise synchronized with the first conveyor segment 18 such that it occurs when the at least one of the confection mold trays 12 is at rest. As disclosed above, the confection mold trays 12 are intermittently conveyed along the first conveyor segment 18. So, for example, the filling apparatus 26 can be communicably or physically coupled with the first conveyor segment 18 such that it ceases dispensing when the first pusher bar 56 and/or the second pusher bar 66 are translated in the first direction and proceeds with dispensing confection when the first pusher bar 56 and/or the second pusher bar 66 are translated in the second direction.

At block 808, the method 800 comprises continuously advancing the confection mold trays 12 along the second conveyor segment 20. Specifically, as noted above, the second conveyor segment 20 is aligned in the first direction with the first conveyor segment 18 and positioned to receive the one or more confection mold trays 12 from the first conveyor segment 18. Receiving the confection mold trays 12 from the first conveyor segment 18 can include the first tab 36 sliding into the first helical channel 72 of the first rotatable shaft 70. This sliding occurs initially as a result of the conveyance by the first conveyor segment 18. Then the confection mold trays 12 can continue sliding along the second conveyor segment 20 via rotation of the first rotatable shaft 70, which causes the first tab 36 to slide forward within the first helical channel 72. Likewise, the second tab 38 can similarly be conveyed into the second helical channel 76 of the second rotatable shaft 74. The timing of rotation of the first and second rotatable shafts 70, 74 can be synchronized or otherwise provided by the same rotary actuation source or motor (e.g., one of the actuators 64). This allows even and continuous advancement of the confection mold trays 12 along the second conveyor segment 20 in the first direction, particularly during cooling of the confection therein.

In some aspects, as depicted in block 810, the method 800 can further include a step of cooling the confection in the mold cavities 32 of the confection mold trays 12. For example, the cooling can occur while the confection mold trays 12 are continuously advanced along the second conveyor segment 20. Cooling can occur naturally or, in some aspects, can be assisted with various forms of refrigeration, forced air circulation, fans, or the like. Furthermore, in some aspects, air can be forced into the air gap between stacks of the confection mold trays 12 to further assist in hardening of the confection or other molded items formed within the mold cavities 32.

In some implementations, the cooling process is passive, occurring naturally as the mold trays 12 advance along the conveyor system 10.

The method 800 can further comprise, as depicted in block 812, a step of conveying the confection mold trays 12 along the third conveyor segment 22. As noted above, the third conveyor segment 22 is aligned in the first direction with the second conveyor segment 20 and positioned to receive the confection mold trays 12 from the second conveyor segment 20. In some aspects, the third pusher fingers 80 and/or the fourth pusher fingers 84 can engage with the first edge 30 of one or more of the confection mold trays 12 or the bottom surface 34 and translate the confection mold trays 12 in the first direction via translation of the third pusher bar 78 and/or the fourth pusher bar 82 in the first direction. For example, having the third and fourth pusher fingers 80, 84 engage with the bottom surface 34 of the confection mold trays 12, instead of sides or top surfaces thereof, may would limit exposure of the pusher fingers and/or the pusher bars to spilled confection. Additionally, similar to the first conveyor segment 18, the third conveyor segment 22 can also be operated to automatically change the orientation of the third pusher fingers 80 and/or the fourth pusher fingers 84 to avoid engagement with the confection mold trays 12 while the third pusher bar 78 and/or the fourth pusher bar 82 is translated in the second direction.

In some aspects, the method 800 can comprise, as depicted in block 814, a step of stacking the confection mold trays 12 via the stacking system 24. As noted above, the stacking system 24 can be aligned in the first direction with the third conveyor segment 22 and positioned to receive the confection mold trays 12 conveyed from the third conveyor segment 22. As noted above, the intermittent motion of the third conveyor segment 22 can advantageously allow the stacking system 24 to receive one of the confection mold trays 12 and have sufficient time to move the received confection mold tray 12 in an upwards or downwards direction prior to receiving a subsequent one of the confection mold trays 12 to be stacked therewith. For example, the stacking system 24 can stack the confection mold trays 12 with the confection therein by raising and/or lowering (pneumatically or using other actuators) a vertical stack of the confection mold trays 12 and pulling, lifting, or otherwise receiving one of the confection mold trays 12 to add it to the vertical stack at a predetermined rate and/or a rate corresponding with a rate of intermittent conveyance occurring via the third conveyor segment 22. Alternatively, the stacking system 24 can maintain the vertical stack of the confection mold trays 12 on, above, or at an end of the third conveyor segment 22, conveying upward a bottom one of the confection mold trays 12 from the third conveyor segment 22 at a rate corresponding with a rate of intermittent conveyance occurring via the third conveyor segment 22.

Figure 9:
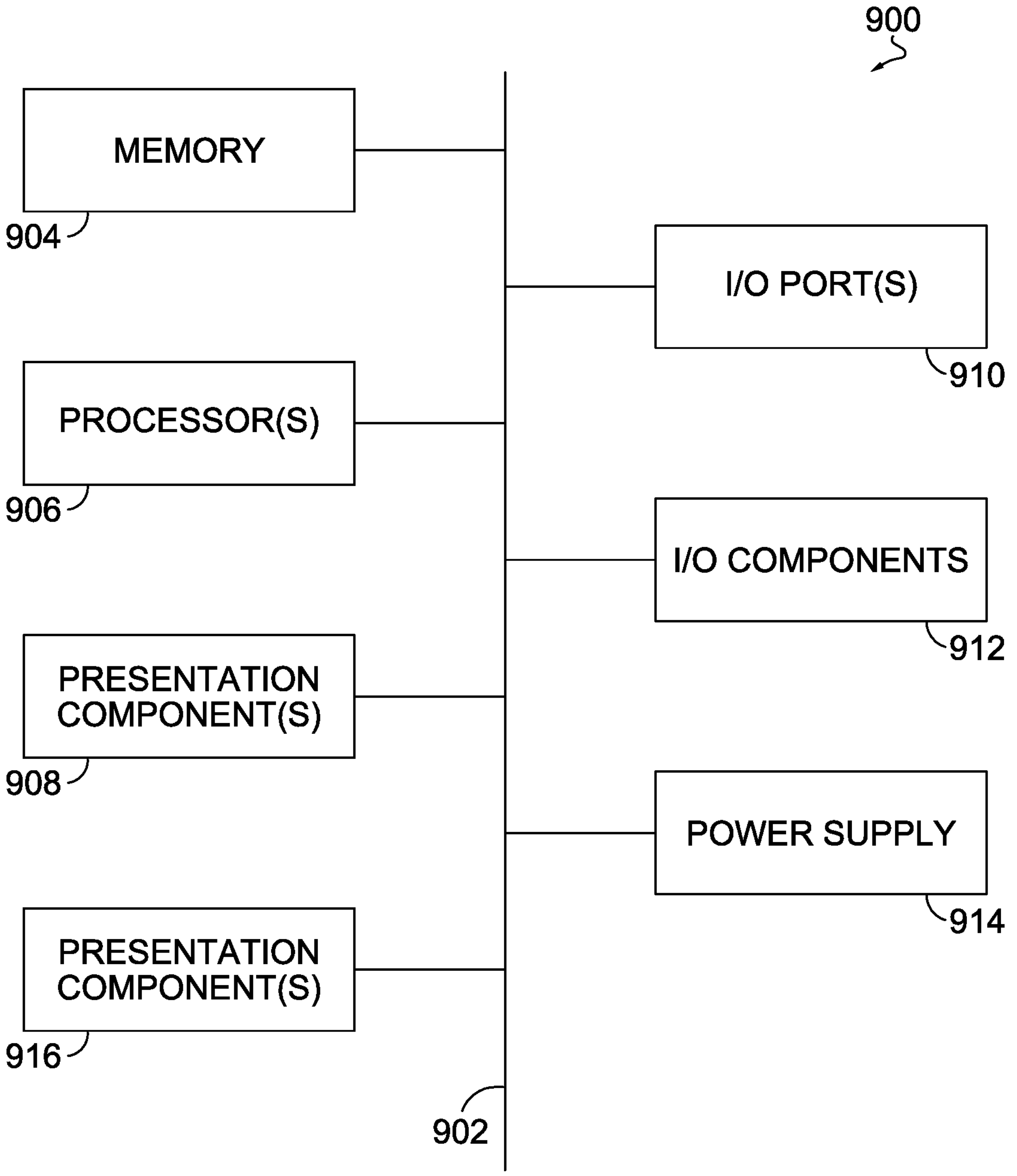
FIG. 9 depicts an example computing environment suitable for use in implementations of the present disclosure.

Referring to FIG. 9, a diagram is depicted of an example computing environment suitable for use in implementations of the present disclosure for automating or instructing various ones of the method steps described above, such as instructing actuation of one or more of the components described herein. In particular, the example computer environment is shown and designated generally as computing device 900. Computing device 900 is but one example of a suitable computing environment and is not intended to suggest any limitation as to the scope of use or functionality of the invention. Neither should computing device 900 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 9, computing device 900 includes bus 902 that directly or indirectly couples the following devices: memory 904, one or more processors 906, one or more presentation components 908, input/output (I/O) ports 910, I/O components 912, and power supply 914. Bus 902 represents what may be one or more busses (such as an address bus, data bus, or combination thereof). Although the devices of FIG. 9 are shown with lines for the sake of clarity, in reality, delineating various components is not so clear, and metaphorically, the lines would more accurately be grey and fuzzy. For example, one may consider a presentation component such as a display device to be one of I/O components 912. Also, processors, such as one or more processors 906, have memory. The present disclosure hereof recognizes that such is the nature of the art, and reiterates that FIG. 9 is merely illustrative of an example computing environment that can be used in connection with one or more implementations of the present disclosure. Distinction is not made between such categories as "workstation," "server," "laptop," "handheld device," etc., as all are contemplated within the scope of FIG. 9 and refer to "computer" or "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 904 includes computer-storage media in the form of volatile and/or nonvolatile memory. Memory 904 may be removable, non-removable, or a combination thereof. Example memory includes solid-state memory, hard drives, optical-disc drives, etc. Computing device 900 includes one or more processors 906 that read data from various entities such as bus 902, memory 904 or I/O components 912. One or more presentation components 908 presents data indications to a person or other device. Example one or more presentation components 908 include a display device, speaker, printing component, vibrating component, etc. I/O ports 910 allow computing device 900 to be logically coupled to other devices including I/O components 912, some of which may be built in computing device 900. Illustrative I/O components 912 include a microphone, joystick, game pad, satellite dish, scanner, printer, wireless device, etc.

Radio 916 represents a radio that facilitates communication with a wireless telecommunications network or other wireless communications networks. Illustrative wireless telecommunications technologies include CDMA, GPRS, TDMA, GSM, and the like. Radio 816 might additionally or alternatively facilitate other types of wireless communications including Wi-Fi, WiMAX, LTE, or other VoIP communications. As can be appreciated, in various embodiments, radio 916 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

The computing device 900 can be communicably coupled via wired and/or wireless components described above to any combination of sensors and/or actuators to assist in performing the method steps described above. However, other embodiments of the invention can omit the computing device and can merely require actuators thereof to be turned on or electrically powered via an electrical plug placed into an electrical socket and/or flipping a switch, turning a knob, pressing a button, using a keypad, or the like. Furthermore, although the invention is described herein for the purpose of molding confections, the confection mold trays 12 can alternatively be replaced with molds or mold trays for molding other types of materials without departing from the scope of the invention. Likewise, the confection can be replaced in the methods described herein with other moldable materials such as plastic or the like without departing from the scope of the technology described herein.

Aspects of this technology may be embodied as, among other things, a method, a system, and/or computer-program product associated with the system. Accordingly, the aspects may take the form of a hardware embodiment, or an aspect combining software and hardware. An aspect takes the form of a computer-program product that includes computer-useable instructions embodied on one or more computer-readable media.

Computer-readable media include both volatile and nonvolatile media, removable and non-removable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices and may be considered transitory, non-transitory, or a combination of both. These memory components can store data momentarily, temporarily, or permanently.

Example computing device 900 is suitable for operationally controlling or otherwise implementing one or more of the described features of conveying system 10. For example. Computing device 900 may be used to set the rate at which the conveyor system 10 moves mold trays 12 along the conveyor system 10, thus increasing or decreasing cooling times, which may be further based on at type of confectionary being conveyed, as will be understood by one of ordinary skill in the art. Computing device 900, through one or more drivers stored in memory 904, can operationally and programmatically control any one or more actuators or motors described herein to further facilitate automation of conveyor system 10.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The present invention has been described in relation to particular examples, which are intended in all respects to be illustrative rather than restrictive. From the foregoing, it will be seen that this invention is one well adapted to attain all the ends and objects set forth above, together with other advantages that are obvious and inherent to the system and method. It will be understood that certain features and subcombinations are of utility and may be employed without reference to other features and subcombinations. This is contemplated by and is within the scope of the claims.

Some aspects of this disclosure have been described with respect to the examples provided in the figures. Additional aspects of the disclosure will now be described that may be related subject matter included in one or more claims or clauses of this application at the time of filing, or one or more related applications, but the claims or clauses are not limited to only the subject matter described in the below portions of this description. These additional aspects may include features illustrated by the figures, features not illustrated by the figures, and any combination thereof. When describing these additional aspects, reference may be made to elements depicted by the figures for illustrative purposes.

As used herein and in connection with the claims listed hereinafter, the terminology "any of clauses" or similar variations of said terminology is intended to be interpreted such that features of claims/clauses may be combined in any combination. For example, an exemplary clause 4 may indicate the method/apparatus of any of clauses 1 through 3, which is intended to be interpreted such that features of clause 1 and clause 4 may be combined, elements of clause 2 and clause 4 may be combined, elements of clause 3 and 4 may be combined, elements of clauses 1, 2, and 4 may be combined, elements of clauses 2, 3, and 4 may be combined, elements of clauses 1, 2, 3, and 4 may be combined, and/or other variations.

The following claims are presented with single dependencies to comply with U.S. practice. However, unless the features of the claims are incompatible, it is envisaged that any claim may be dependent upon any one, or any combination, of the preceding claims.

What is claimed is:

1. A method comprising:

conveying, by intermittent movement, one or more confection mold trays along a first conveyor segment of a confection mold conveyor, the intermittent movement being performed by a series of spaced apart pusher fingers extending from a pusher bar being translated in a first direction and a second direction opposite the first direction, wherein the pusher fingers are each oriented to engage the one or more confection mold trays while the pusher bar is translated in the first direction, and wherein the pusher fingers are each oriented to avoid engagement with the one or more confection mold trays while the pusher bar is translated in the second direction;

transitioning the one or more confection mold trays from the first conveyor segment to a second conveyor segment of the confection mold conveyor, the second conveyor segment aligned with the first conveyor segment; and conveying, by continuous movement, the one or more confection mold trays along the second conveyor segment.

2. The method of claim 1, wherein the continuous movement of the one or more confection mold trays along the second conveyor segment is performed by a rotatable shaft with a helical channel formed therein that is sized and configured to receive at least a portion of the one or more confection mold trays, and wherein rotation of the rotatable shaft is configured to continuously advance the one or more confection mold trays in the first direction.

3. The method of claim 1, wherein the one or more confection mold trays are further conveyed along the first conveyor segment by a second pusher bar having a series of spaced apart second pusher fingers extending from the second pusher bar, wherein the second pusher fingers are each oriented to engage the one or more confection mold trays while the second pusher bar is translated in the first direction, and wherein the second pusher fingers are each oriented to avoid engagement with the one or more confection mold trays while the second pusher bar is translated in the second direction.

4. The method of claim 1, further comprising conveying the one or more confection mold trays along a third conveyor segment aligned with the first conveyor segment and the second conveyor segment.

5. The method of claim 4, wherein the one or more confection mold trays are conveyed along the third conveyor segment via intermittent movement.

6. The method of claim 4, wherein the one or more confection mold trays are conveyed along the third conveyor segment by another pusher bar having a series of spaced apart pusher fingers extending from the another pusher bar, wherein the pusher fingers of the another pusher bar are each oriented to engage the one or more confection mold trays while the another pusher bar is translated in the first direction, wherein the pusher fingers of the another pusher bar are each oriented to avoid engagement with the one or more confection mold trays while the another pusher bar is translated in the second direction.

7. The method of claim 1, wherein the pusher fingers of the pusher bar engage the one or more confection mold trays at an engagement portion of the pusher fingers.

8. A method comprising:

translating, in a first direction, a pusher bar having a series of spaced apart pusher fingers extending therefrom, wherein the pusher fingers are each oriented to engage one or more confection mold trays while the pusher bar is translated in the first direction;

translating, in a second direction that is opposite the first direction, the pusher bar, wherein the pusher fingers are each oriented to avoid engagement with the one or more confection mold trays while the pusher bar is translated in the second direction, and wherein the pusher bar is translated in the first direction and the second direction within a first conveyor segment of a confection mold conveyor; and while the pusher bar is translated in the first direction and the second direction, rotating a rotatable shaft with a helical channel formed therein that is sized and configured to move the one or more confection mold trays, wherein the rotatable shaft is included within a second conveyor segment of the confection mold conveyor and is positioned to receive the one or more confection mold trays from the first conveyor segment.

9. The method of claim 8, further comprising translating, in the first direction, a second pusher bar having a series of spaced apart second pusher fingers extending therefrom, wherein the second pusher fingers are each oriented to engage the one or more confection mold trays while the second pusher bar is translated in the first direction, and wherein the second pusher bar is translated in the first direction within the first conveyor segment.

10. The method of claim 8, further comprising translating, in the second direction, a second pusher bar having a series of spaced apart second pusher fingers extending therefrom, wherein the second pusher fingers are each oriented to avoid engagement with the one or more confection mold trays while the second pusher bar is translated in the second direction, and wherein the second pusher bar is translated in the second direction within the first conveyor segment.

11. The method of claim 8, further comprising translating, in the first direction, another pusher bar having a series of spaced apart pusher fingers extending therefrom, wherein the pusher fingers of the another pusher bar are each oriented to engage the one or more confection mold trays while the another pusher bar is translated in the first direction, and wherein the another pusher bar is translated in the first direction within a third conveyor segment of the confection mold conveyor, and wherein the another conveyor segment is positioned to receive the one or more confection mold trays from the second conveyor segment.

12. The method of claim 8, further comprising translating, in the second direction, another pusher bar having a series of spaced apart pusher fingers extending therefrom, wherein the pusher fingers of the another pusher bar are each oriented to avoid engagement with the one or more confection mold trays while the another pusher bar is translated in the second direction, and wherein the another pusher bar is translated in the second direction within a third conveyor segment of the confection mold conveyor, and wherein the third conveyor segment is positioned to receive the one or more confection mold trays from the second conveyor segment.

13. The method of claim 8, wherein the pusher fingers engage the one or more confection mold trays at an engagement portion of the pusher fingers.

14. A method comprising:

conveying, by intermittent movement, one or more confection mold trays in a first direction along a first conveyor segment of a confection mold conveyor;

transitioning the one or more confection mold trays from the first conveyor segment to a second conveyor segment of the confection mold conveyor, the second conveyor segment aligned with the first conveyor segment; and conveying, by continuous movement, the one or more confection mold trays along the second conveyor segment, the second conveyor segment including a first rotatable shaft with a first helical channel formed therein that is sized and configured to receive at least a portion of the one or more confection mold trays, and wherein rotation of the first rotatable shaft is configured to continuously advance the one or more confection mold trays in the first direction.

15. The method of claim 14, wherein the continuous movement along the second conveyor segment is further facilitated by a second rotatable shaft with a second helical channel formed therein that is sized and configured to receive at least a portion of the one or more confection mold trays, and wherein rotation of the second rotatable shaft is configured to continuously advance the one or more confection mold trays in the first direction.

16. The method of claim 15, wherein the first rotatable shaft is laterally spaced apart from and parallel with the second rotatable shaft, and the first rotatable shaft and the second rotatable shaft are each offset from a midline of the second conveyor segment.

17. The method of claim 15, wherein the first rotatable shaft and the second rotatable shaft rotate at substantially a same rate.

18. The method of claim 17, wherein the first rotatable shaft is mechanically linked to the second rotatable shaft, such that the mechanical linkage causes the first rotatable shaft and the second rotatable shaft to rotate at substantially the same rate.

19. The method of claim 14, wherein the first helical channel is sized and configured to receive a tab of the one or more confection mold trays.

20. The method of claim 14, wherein the intermittent movement is performed by a series of spaced apart pusher fingers extending from a pusher bar that is translated in a first direction and a second direction opposite the first direction, and wherein the pusher fingers are each oriented to engage the one or more confection mold trays while the pusher bar is translated in the first direction, and wherein the pusher fingers are each oriented to avoid engagement with the one or more confection mold trays while the pusher bar is translated in the second direction.

* * * * *